(12) United States Patent
Hatakeyama

(10) Patent No.: US 6,542,468 B1
(45) Date of Patent: Apr. 1, 2003

(54) APPARATUS METHOD AND STORAGE MEDIUM FOR AUTONOMOUS SELECTION OF A PATH BY TUNING RESPONSE TIMES

(75) Inventor: Takahisa Hatakeyama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,593

(22) Filed: Oct. 19, 1998

(30) Foreign Application Priority Data

Dec. 5, 1997 (JP) ............................................. 9-335543

(51) Int. Cl.⁷ .......................... H04L 12/56; H04L 12/26
(52) U.S. Cl. ........................ 370/238; 370/351; 370/352; 370/353; 370/354; 370/355; 370/356; 370/357
(58) Field of Search ................................. 370/238, 351, 370/352, 353, 354, 355, 356, 357; 379/900

(56) References Cited

U.S. PATENT DOCUMENTS

| | | | | |
|---|---|---|---|---|
| 4,706,080 A | * | 11/1987 | Sincoskie | 340/825.02 |
| 5,255,345 A | * | 10/1993 | Shaefer | 395/13 |
| 5,359,593 A | | 10/1994 | Derby et al. | |
| 5,504,894 A | | 4/1996 | Ferguson et al. | |
| 5,881,051 A | * | 3/1999 | Arrowood et al. | 370/248 |
| 6,044,075 A | * | 3/2000 | Le Boudec et al. | 370/351 |
| 6,067,499 A | * | 5/2000 | Yagyu et al. | 701/201 |
| 6,072,409 A | * | 6/2000 | Fushimi et al. | 340/988 |
| 6,078,652 A | * | 6/2000 | Barak | 379/115 |
| 6,215,771 B1 | * | 4/2001 | Turner et al. | 370/235 |
| 6,259,673 B1 | * | 7/2001 | Yoshihara et al. | 370/238 |
| 6,310,883 B1 | * | 10/2001 | Mann et al. | 370/408 |
| 6,327,591 B1 | * | 12/2001 | Osborn et al. | 707/70 |

FOREIGN PATENT DOCUMENTS

| | | |
|---|---|---|
| JP | 7-87102 | 3/1995 |
| JP | 2524465 | 5/1996 |

OTHER PUBLICATIONS

E–G. Talbi & P. Bessiere. A Parallel Genetic Algorithm for the Graph Partitioning Problem. 1991 ACM. pp. 312–320.*
L. Zhu, R. Wainwright, and D. Schoenefeld. A Genetic Algorithm for the Point to Multipoint Routing Problem with Varying Number of Requests. 1998 IEEE. pp. 171–176.*
F. Abuali, D. Scoenefeld, and R. Wainwright. Designing Telecommunications Networks using Genetic Algorithms and Probabilisitc Minimum Spanning Trees. 1994 ACM. pp. 242–247.*

(List continued on next page.)

Primary Examiner—Hassan Kizou
Assistant Examiner—Joe Logsdon
(74) Attorney, Agent, or Firm—Staas & Halsey LLP

(57) ABSTRACT

The present invention provides a system, which relates to request and response processes between a transmission source node and a transmission destination node, for autonomously selecting an optimum path by obtaining an actual response time per unit data length and estimating a response time for each path. Upon receipt of a response, which is returned from a transmission destination node 111, to a service request issued from the transmission source node (client), a path selecting apparatus calculates and stores an actual response time. The system comprises estimation individuals to be used for estimating a response time for each of clients, and makes each of the plurality of estimation individuals evolve into an estimation individual which can make a more preferable estimate by using a genetic algorithm, each time the actual response time is stored. When any of the clients requests a service of any of servers, the system calculates an estimated response time for each of the paths which can make a data communications with any of the servers by using the estimation individual, selects the path with the minimum estimated response time, and transmits the service request on the selected path.

37 Claims, 15 Drawing Sheets

OTHER PUBLICATIONS

Christensen . . . .*

Claffy, K. et al. "Measurement Considerations for Assessing Unidirectional Latencies" 1993. Dept. of Computer Science and Engineering, University of California.

Mahmoud, Q., "Sockets Programming in Java: A Tutorial" 1996. http:/www.javaworld.com/javaworld/jw–12–1996/jw–12–sockets.html.

Carter, R. et al. "Measuring Bottleneck Link Speed in Packet–Switched Networks" 1996. Computer Science Department, Boston University.

Murthy, S., et al. "Routing in Packet–Switched Networks Using Path–Finding Algorithms" 1996. University of California, Santa Cruz.

Alritt, M. et al. "Web Server Workload Characterization: The Search for Invariants (Extended Version)" 1996. Department of Computer Science, University of Saskatchewan.

Paxson, V., "End–to–End Internet Packet Dynamics" 1997. University of California, Berkeley.

Masaharu Munetomo, et al., "An Efficient Migration Scheme for Subpopulation–Based Asynchronously Parallel Genetic Algorithms," Hokkaido University Information Engineering Technical Report, HIER–IS–9301, Jul., 1993.

Masaharu Munetomo, et al., A Genetic Approach to Dynamic Load Balancing in a Distributed Computing System, Hokkaido University Information Engineering Technical Report, HIER–IS–9303, Dec. 1993.

Masaharu Munetomo, "A Stochastic Genetic Algorithm for Dynamic Load Balancing in Distributed Systems," Information and Data Analysis, Division of Systems and Information Engineering, Hokkaido University, Sapporo 060, Japan, 1995.

Masaharu Munetomo, et al., "Genetic–Based Dynamic Load Balancing: Implementation and Evaluation," Information and Data Analysis, Faculty of Engineering, Hokkaido University, Sapporo 060, Japan, 1996.

Masaharu Munetomo, et al., "On Tracking–ability of a Stochastic Genetic Algorithm to Changing Environments," Information and Data Analysis, Division of Systems and Information Engineering, Hokkaido University, Sapporo 060, Japan, 1996.

Masaharu Munetomo, et al., An Adaptive Network Routing Algorithm Employing Path Genetic Operators, Information and Data Analysis, Graduate School of Engineering, Hokkaido University, Sapporo, 060, Japan, 1997.

Munetomo et al., "An Efficient Migration Scheme for Subpopulation–Based Asynchronously Parallel Genetic Algorithms" Hokkaido University, Jul, 1993.

Munetomo, et al., "A Genetic Approach to Dynamic Load Balancing in a Distributed Computing System" Hokkaido University, Dec., 1993.

Munetomo, et al. On Tracking–ability of a Stochastic Genetic Algorithm to Changing Environments, Hokkaido University.

Munetomo, et al. "A Stochastic Genetic Algorithm for Dynamic Load Balancign in Distributed Systems" Hokkaido University.

* cited by examiner

160

| PROXY SERVER NAME |
|---|
| PROXY1. AAA. com |
| PROXY2. AAB. com |
| PROXY3. AAA. com |
| ⋮ |

| REPRESENTATIVE SERVER NAME | MIRROR SERVER NAME |
|---|---|
| www. BBB. com | www1. BBB. com |
| www. BBB. com | www2. BBB. com |
| www. BBB. com | www3. BBB. com |
| ⋮ | ⋮ |

FIG. 3(B)

| GENE BLOCK | VALUE TO BE ASSIGNED |
| --- | --- |
| 0 | MOST RECENT INFLUENCE COEFFICIENT (CNEW) |
| 1 | DISTANCE INFLUENCE COEFFICIENT (CDIST) |
| 2 | UNUSED |
| 3 | UNUSED |
| 4 | INTER-SUBNETWORK DISTANCE INFLUENCE COEFFICIENT (CSNET1) |
| 5 | INTER-SUBNETWORK DISTANCE INFLUENCE COEFFICIENT (CSNET2) |
| 6 | INTER-SUBNETWORK DISTANCE INFLUENCE COEFFICIENT (CSNET3) |
| 7 | INTER-SUBNETWORK DISTANCE INFLUENCE COEFFICIENT (CSNET4) |

FIG. 5

APPARATUS METHOD AND STORAGE MEDIUM FOR AUTONOMOUS SELECTION OF A PATH BY TUNING RESPONSE TIMES

BACKGROUND OF THE INVENTION

1. Field of the Invention

The present invention relates to an apparatus for selecting an optimum path in a network environment where nodes are distributed and located via a network. More particularly, to an apparatus which estimates and selects an optimum path used to transmit data and its response according to a response times per unit data length of transmission data or of response data when one node transmits service request data to another node among the plural nodes distributed via the network and the response to the transmitted data is returned from the transmission destination node to the transmission source node.

2. Description of the Related Art

With the rapid popularization of the Internet in recent years, the amount of data transmitted/received over the Internet has been significantly increasing. The type and purpose of the data to be transmitted/received over the Internet are diversified. For example, the data of a home page downloaded from a WWW server, the file data of each type of software transmitted from an FTP server, e-mail from a company or an individual are diversified.

In such a situation, Internet users may frequently spend a long time in downloading data from a requested home page, that is, in displaying of the home page, or in downloading a file. This is because the users cannot determine which server is most efficient although mirror servers are provided.

Additionally, since network topology becomes complicated and the node configuration of a network continuously varies, an optimum network path dynamically and significantly changes in its form and its time. Therefore, selecting an optimum path is more difficult for network administrators or network engineers.

However, conventional protocols for selecting a path collect the information such as the number of routers (hop count) interposed between a transmission source address and a transmission destination address, a bandwidth (maximum data flow rate), and traffic (an actual data flow rate), etc., and calculate a path by using these items of information as indices, in each repeater. With these techniques, the response times per unit data length of transmission data and the response data are not used for the calculation of the path selection when one node transmits the data which requests a service to another node and this node returns the data which respond to the transmission data.

As typical examples of the conventional routing protocols, RIP and OSPF can be cited.

The RIP (Routing Information Protocol: RFC 1058) is a dynamic routing information exchange protocol between routers or between a router and a host in an autonomous system. The RIP adopts a distance vector algorithm, and is used by many UNIX systems and routers. According to the RIP, the numbers of routers (hop count) via which data reaches a transmission destination are exchanged between a router and its contiguous router at predetermined time intervals, and a communication path is selected in order to minimize the hop count. Note that the hop count that can be administered is up to 15.

The OSPF (Open Shortest Path First: RFC 1583) adopts a link state algorithm. According to this protocol, network link information (link state) are exchanged between routers, and each of the routers selects an optimum communication path based on the link information. The OSPF can select an optimum cost path in consideration of a network load, a line cost/speed, a delay, etc., and distributes a load by securing paths which costs the same.

Additionally, the example in which a genetic algorithm is applied to the RIP is disclosed as the paper titled "An Adaptive Network Routing Algorithm Employing Path Genetic Operators (Seventh International Conference on Genetic Algorithms (ICGA '97))" by Masaharu Munetomo, Yoshiaki Takai, Yoshiharu Sato, et al. in 1997.

The genetic algorithm (GA) is a technique which simulates and applies the mechanism of inheritance of living things. In the evolution of living things, crossover of chromosomes possessed by an individual, or mutation of a gene in a chromosome, may occur when a new individual (child) is born from an old individual (parent). An individual which is not adaptive to an environment is not selected, and an adaptive individual survives and becomes a parent of a new descendant. In this way, a group of individuals which are adaptive to an environment will survive. To what degree each individual will adapt to an environment is determined by a chromosome or a genome.

In the genetic algorithm, a candidate of solution to a combinatorial optimization problem is represented as a character string corresponding to a chromosome which is a one-dimensional string of genes. An optimum solution is searched by repeatedly performing genetic operations such as selection by self-reproduction, crossover, mutation, etc. for a group of solution candidates (referred to as individuals). The above described character string may also be a numeral string represented by, for example, "0" and "1".

Here, the evolution of a living thing corresponds to a process that the value of an objective function (function for evaluating the degree of fitness of a solution candidate) for a solution candidate approaches an optimum value. A fitness degree function whose value is larger as it makes the objective function more optimum is defined for a character string (chromosome). The selection operation is an operation for calculating the evaluation value of each character string by using the fitness degree function, choosing a character string with a high evaluation value from the group of solution candidates, and defining the selected string as a group of solution candidates of a next generation. The mutation operation is an operation for replacing some bits (some genes) included in a character string (bit string) with their values inverted at random (if the original bit is "1", it is replaced with "0", and vice versa). The crossover operation is an operation for exchanging parts of two character strings.

By repeating these operations, a character string with a higher evaluation value, that is, a solution candidate for further optimizing the objective function can be obtained. Genetic algorithms are said to be suitable for solving an optimization problem of a discrete variable, which is large-scaled and multi-peaked, and moreover, they can be easily applied to the above described optimization problem. Therefore, these algorithms are widely used.

In the above described paper by Munetomo et al., a substitute route is generated by a genetic algorithm which uses the mutation and crossover operations in addition to a default route in a routing table generated in a routing table in such a way that each router minimizes the hop count based on the RIP. The probabilities (frequencies) of thus generated paths are determined according to a communication wait time when each of the paths is used. If the evaluation value based on the wait time becomes lower than a predetermined value, this genetic algorithm is applied and another new path is generated.

Here, the mutation operation indicates an operation for changing, for example, one router to its contiguous router among routers structuring a path, and forming a new path by connecting the shortest path between the changed router and a transmission source node and the shortest path between the router and a transmission destination node. The crossover operation is an operation for choosing a combination of routers included in both of the above described pair of paths, choosing one router from the combination, replacing all of the routers existing on a route between the router and a transmission destination node; and generating a new path.

Additionally, TOKUGANHEI 5-87597 (Japanese Patent Laid-Open Publication) "Path Specifying Mechanism of Transaction Processing Server" discloses the mechanism for assigning a transaction whose class is the same as that of the transaction of a transaction processing server for performing an optimum process based on a response time of the transaction.

With the above described mechanism, the transaction is divided into classes, for each of which an average response time of the transaction process is calculated. Furthermore, a target response time is set for each of classes, and a performance index is obtained from the target response time for each of the classes.

Upon receiving one transaction, the above described mechanism obtains an estimate performance index when the transaction is processed for each of transaction processing servers which can possibly perform that transaction, and assigns the process of the transaction to the transaction processing server which makes the estimate performance index for all of the classes highest.

With this mechanism, to which server the transaction process is to be assigned is determined based on the response times of previous transaction processes, and the data length and the response time per unit data length, which are used for processing the transaction, are not taken into consideration. Additionally, this mechanism is not intended to control the network path used to transmit the data required for processing the transaction for the server which processes the transaction. As a matter of course, the number of nodes on the network data transmission path between the client and the server which processes the transaction, the difference in the bandwidth of each of communication paths structuring the data transmission path, etc. are not considered.

With conventional path selecting apparatuses, the response times of combinations of all nodes on all paths must be estimated in order to estimate the response time of a combination of arbitrary contiguous paths. To make such estimates, the amounts of passed data at entry and exit must be measured for all of the nodes on all of the paths, and the estimate results must be collected at one point. However, the amounts of passed data cannot be measured depending on a node. Even if the amounts can be measured, they cannot be used for estimating the response time if the notification format of measured data is different.

Additionally, even if a node has the capability for notifying the amounts of passed data, they may not be frequently notified due to a security reason, etc. depending on a node operator. Therefore, with the conventional path selecting apparatuses, the real-time amounts of passed data at a particular node may not exist in many cases, so that the response time cannot be estimated.

Furthermore, the conventional routing protocols for path selection collect the information such as the number of routers (hop count) interposed between a transmission source address and a transmission destination address, a bandwidth (a maximum data flow rate), and traffic (an actual data flow rate), etc., and determines a path by using these items of information as indices in each repeater such as a router, etc. This determination, however, is locally made by each repeater according to the information provided by a router and its contiguous router, and the path is not selected by evaluating the entire performance of the path from the transmission source address to the transmission destination address, which includes also the performances of a network repeater such as a switch, a router, a client, and a server. Accordingly, with the conventional path selecting apparatuses, for example, the switching capability of a router, the cache distribution effect of WWW/PROXY servers, etc. are not considered as performance information, so that an optimum path for a user using a client, that is, the path whose response time to an actual request is short, is not always selected. In addition, since the order of the processing time within a node is conventionally lower than that of a path passage time, the processing time has almost no influence on the estimate of the response time. However, with the recent advent of a LAN (such as a gigabit Ethernet, etc.), a WAN (B-ISDN implemented by an ATM, etc.), or a gigabit router, whose processing speeds are much faster than that of an internal bus of a computer, the processing time within a node has a significant influence on the entire response time.

Furthermore, with the conventional path selecting apparatuses, a repeater contiguous to a client can be selected only in a static manner. That is, it is impossible to select a path in a dynamic manner as the performance of each repeater dynamically varies.

Still further, with the conventional path selecting apparatuses, the cooperative operation between path selecting apparatuses cannot be implemented. For example, it is impossible to determine a repeater depending on a cache type, and to prevent the contents of one cache from existing in repeaters.

Still further, with the conventional path selecting apparatuses, each client can possibly make the same estimate based on the same data if a similar routing algorithm is used by each client. As a result, all clients select the same node as a path, which leads to an extremely degraded response time.

SUMMARY OF THE INVENTION

An object of the present invention is to provide an apparatus, a method, and a storage medium for autonomously selecting an optimum path by recording transmission data and response times per unit data length of response data, which is returned from a transmission destination node to a transmission source node, and by estimating the response time for each path by using the recorded information, when the data requesting a service is transmitted from the transmission source node to the transmission destination node.

Another object of the present invention is to provide an apparatus for selecting a path by using an actual response time per unit data length, which is obtained in consideration of the performances of all of repeaters on a path in addition to the performance of a path between nodes.

A path selecting apparatus according to the present invention is a path selecting apparatus for selecting a network path of data transmitted from a transmission source node to a transmission destination node, and a network path of data returned from the transmission destination node to the transmission source node in an environment where nodes are distributed and located via a network. The apparatus comprises: a path calculating unit for obtaining an estimated response time by using estimated information for each path which can link the transmission source node and the transmission destination node, and for transmitting a service request message by using a path with the minimum estimated response time, when the service request message is transmitted from the transmission source node to the transmission destination node in order to request the service of the transmission destination node; a response information managing unit for storing as response information the information about the transmission of the service request message, which includes at least the path over which the message is transmitted and the request data length of the service request message, when the service request message is transmitted by the path calculating unit, and for storing as the response information the information about the reception of the response, which includes at least the data length of the response and the value about the response time required from the transmission of the service request message till the reception of the response, when the response to the service request message is returned from the transmission destination node to the transmission source node; and an estimation information managing unit for updating the contents of the estimated information based on the response information when the response is received by the response information managing unit. With this configuration, the response time of a path can be estimated even if part of the information about the path cannot be obtained, thereby estimating the response time based on the entire response performance of the path, which includes the performances of a network repeater, a client, a server, etc.

A path selecting method according to the present invention is a method for selecting a network path of data transmitted from a transmission source node to a transmission destination node, and a network path of data returned from the transmission destination node to the transmission source node in an environment where nodes are distributed and located via a network. The method comprises the steps of: obtaining an estimated response time by using estimated information for each path which can connect the transmission source node and the transmission destination node, and transmitting a service request message by using a path with the minimum estimated response time, when the service request message is transmitted from the transmission source node to the transmission destination node in order to request the service of the transmission destination node; storing as response information the information about the transmission of the service request message, which includes at least the path over which the message is transmitted and the request data length of the service request message, when the service request message is transmitted by the path calculating unit, and for storing as the response information the information about the reception of the response, which includes at least the data length of the response and the value about the response time required from the transmission of the service request message till the reception of the response, when the response to the service request message is returned from the transmission destination node to the transmission source node; and updating the contents of the estimated information based on the response information when the response is received by the response information managing unit. With this method, the response time of a path can be estimated even if part of the information about the path cannot be obtained, thereby estimating the response time based on the entire response performance of the path, which includes the performances of respective types of nodes on the path such as a network repeater, a client, a server, etc.

A computer-readable storage medium according to the present invention, stores a program implementing the path selecting method for selecting a network path of data transmitted from a transmission source node to a transmission destination node, and a network path of data returned from the transmission destination node to the transmission source node in an environment where nodes are distributed and located via a network, directs a computer to perform the functions of: obtaining an estimated response time by using estimated information for each path which can connect the transmission source node and the transmission destination node, and transmitting a service request message by using a path with the minimum estimated response time, when the service request message is transmitted from the transmission source node to the transmission destination node in order to request the service of the transmission destination node; storing as response information the information about the transmission of the service request message including at least the path over which the message is transmitted and the request data length of the service request message, when the service request message is transmitted by the path calculating unit, and for storing as the response information the information about the reception of the response, which includes at least the data length of the response and the value about the response time required until the reception of the response from the transmission of the service request message, when the response to the service request message is returned from the transmission destination node to the transmission source node; and updating the contents of the estimated information based on the response information when the response is received by the response information managing unit. With this medium, the response time of a path can be estimated even if part of the information about the path cannot be obtained, thereby estimating the response time based on the entire response performance of the path, which includes the performances of respective types of nodes on the path such as a network repeater, a client, a server, etc.

BRIEF DESCRIPTIONS OF THE DRAWINGS

The present invention will be more apparent from the following detailed description, when taken in conjunction with the accompanying drawings in which.

Figure 4A:
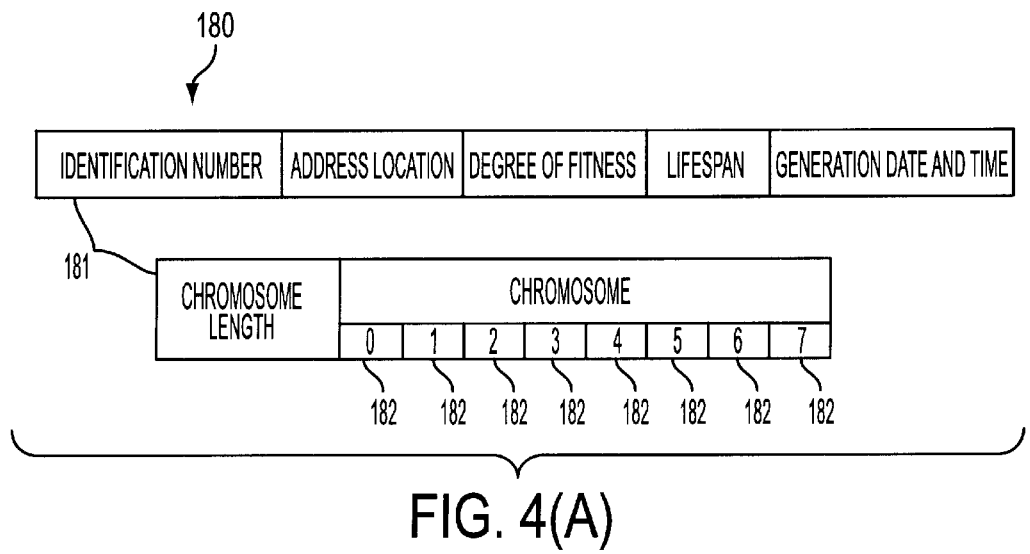
Figure 4B:
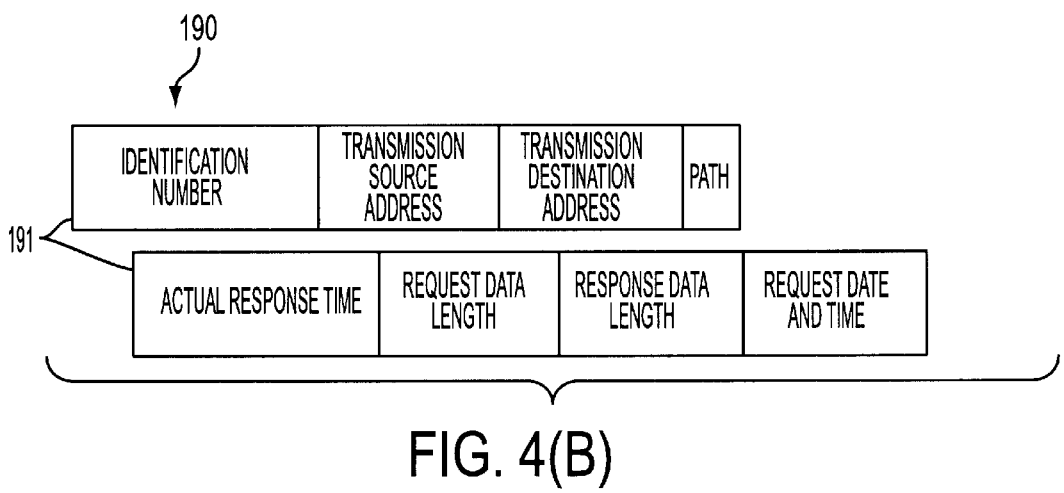
Figure 6:
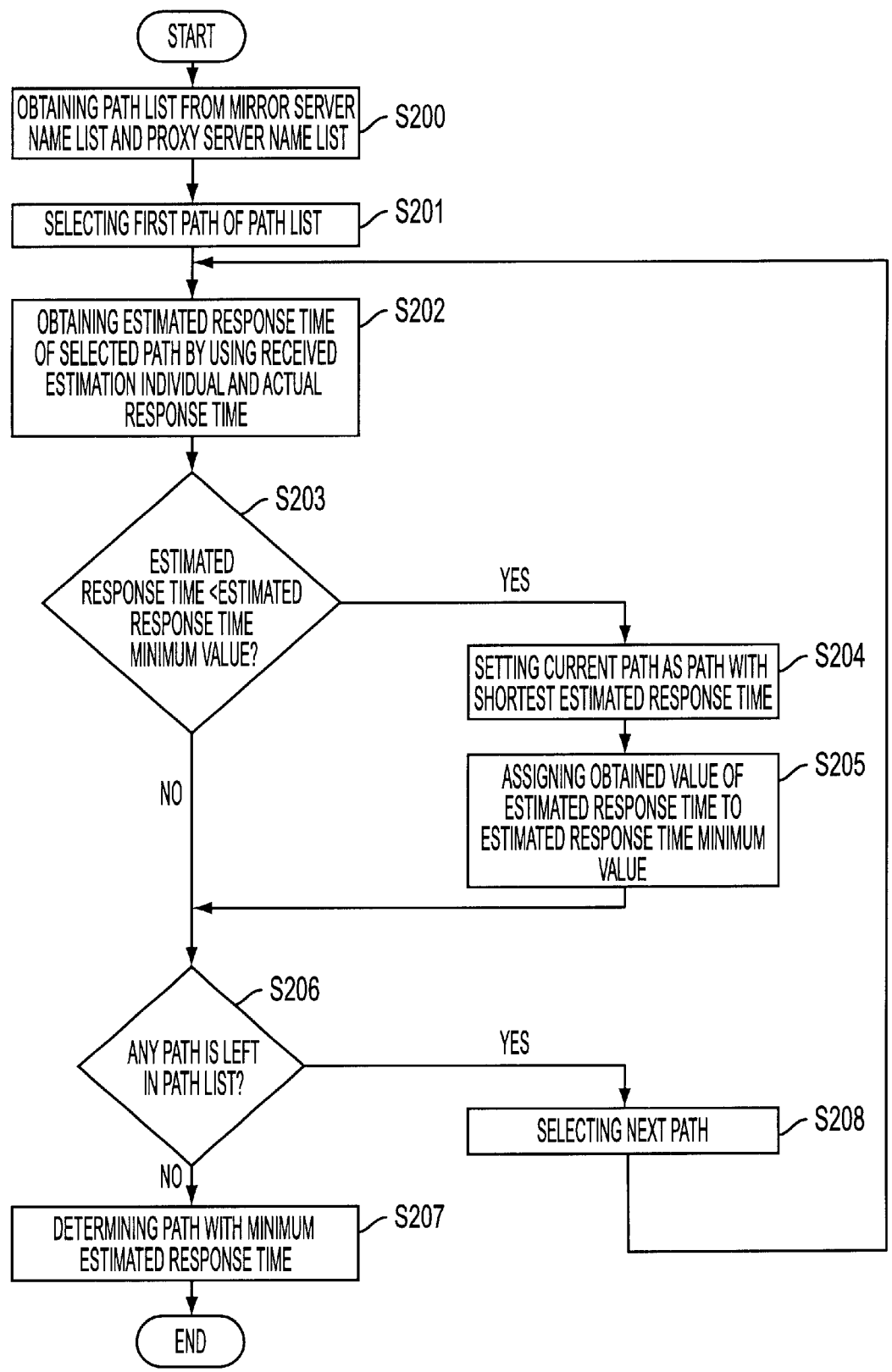
Figure 7:
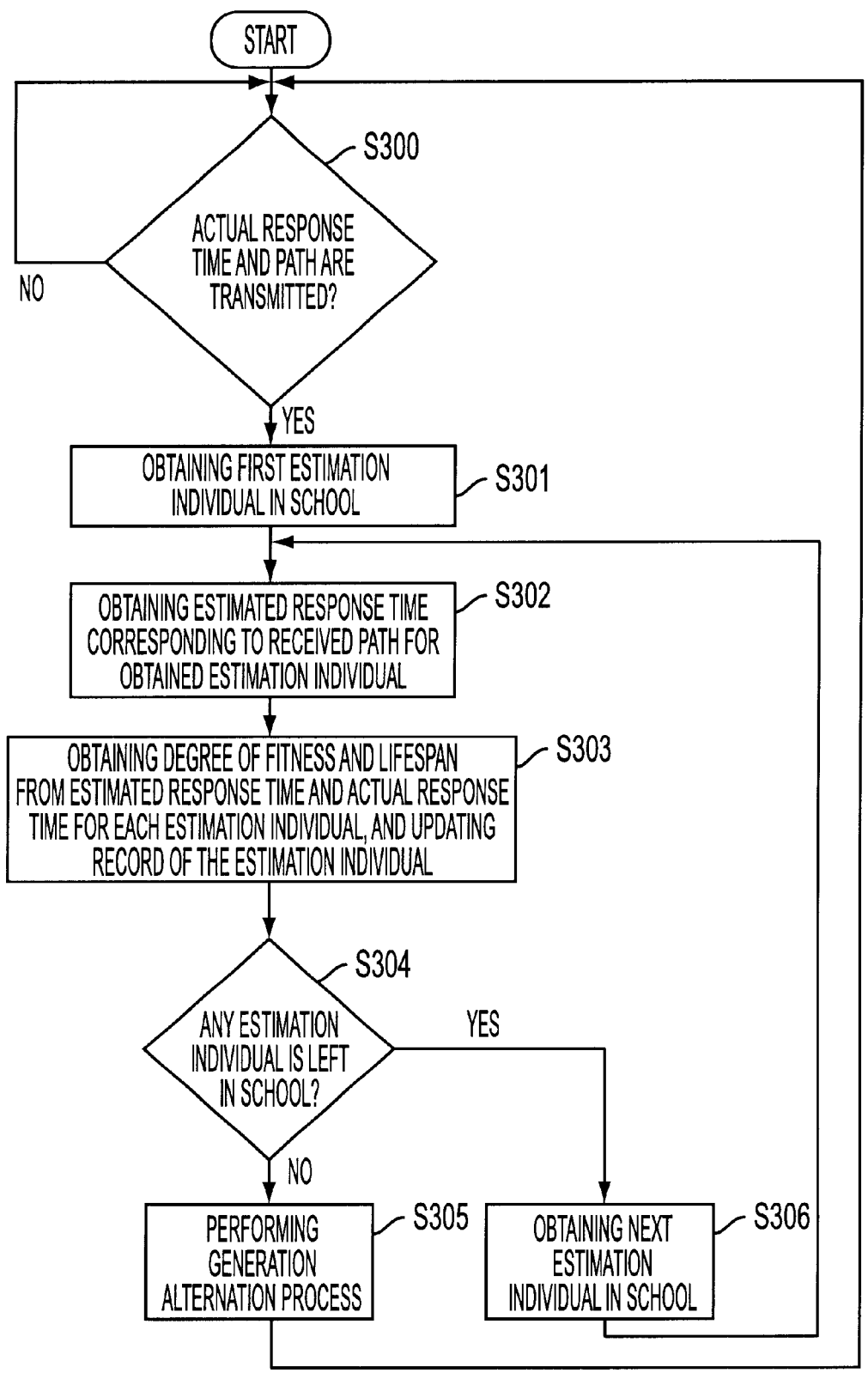
Figure 8:
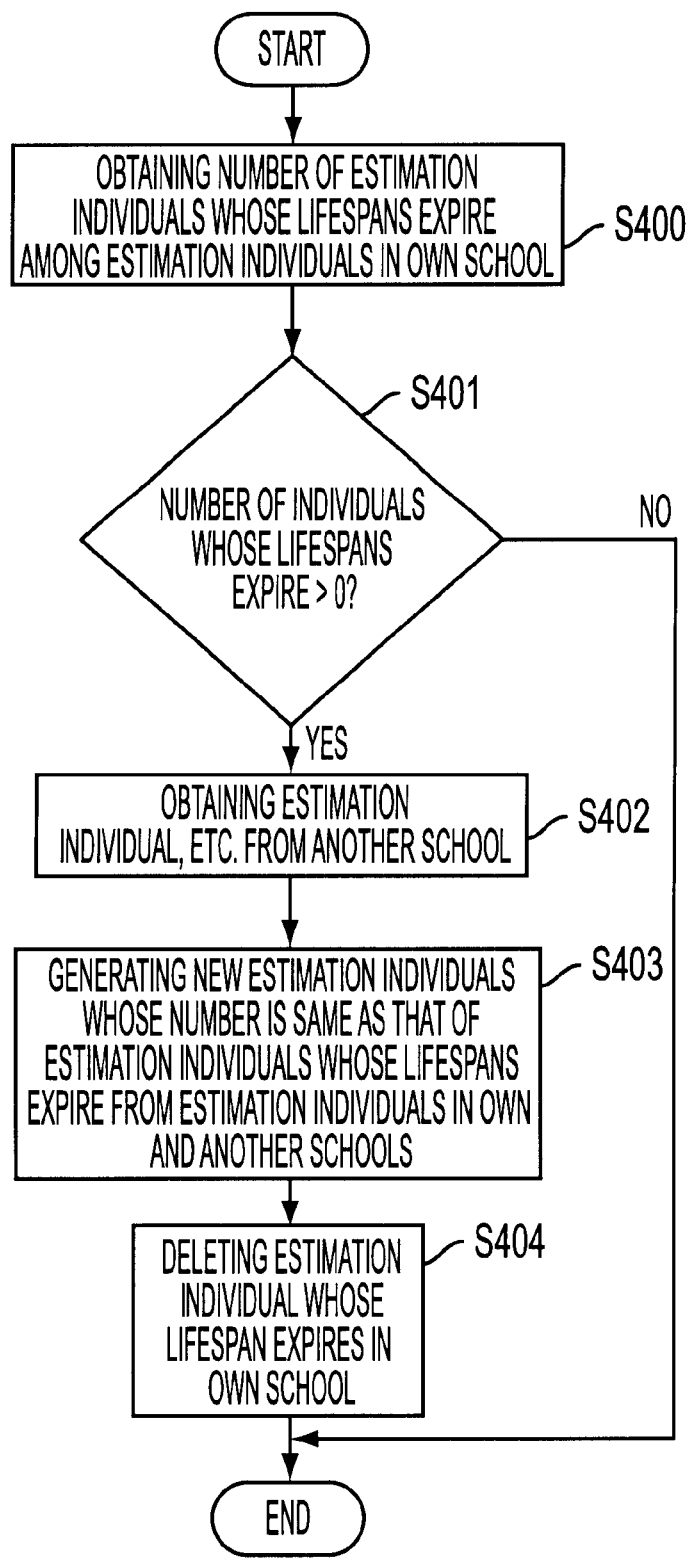
Figure 9:
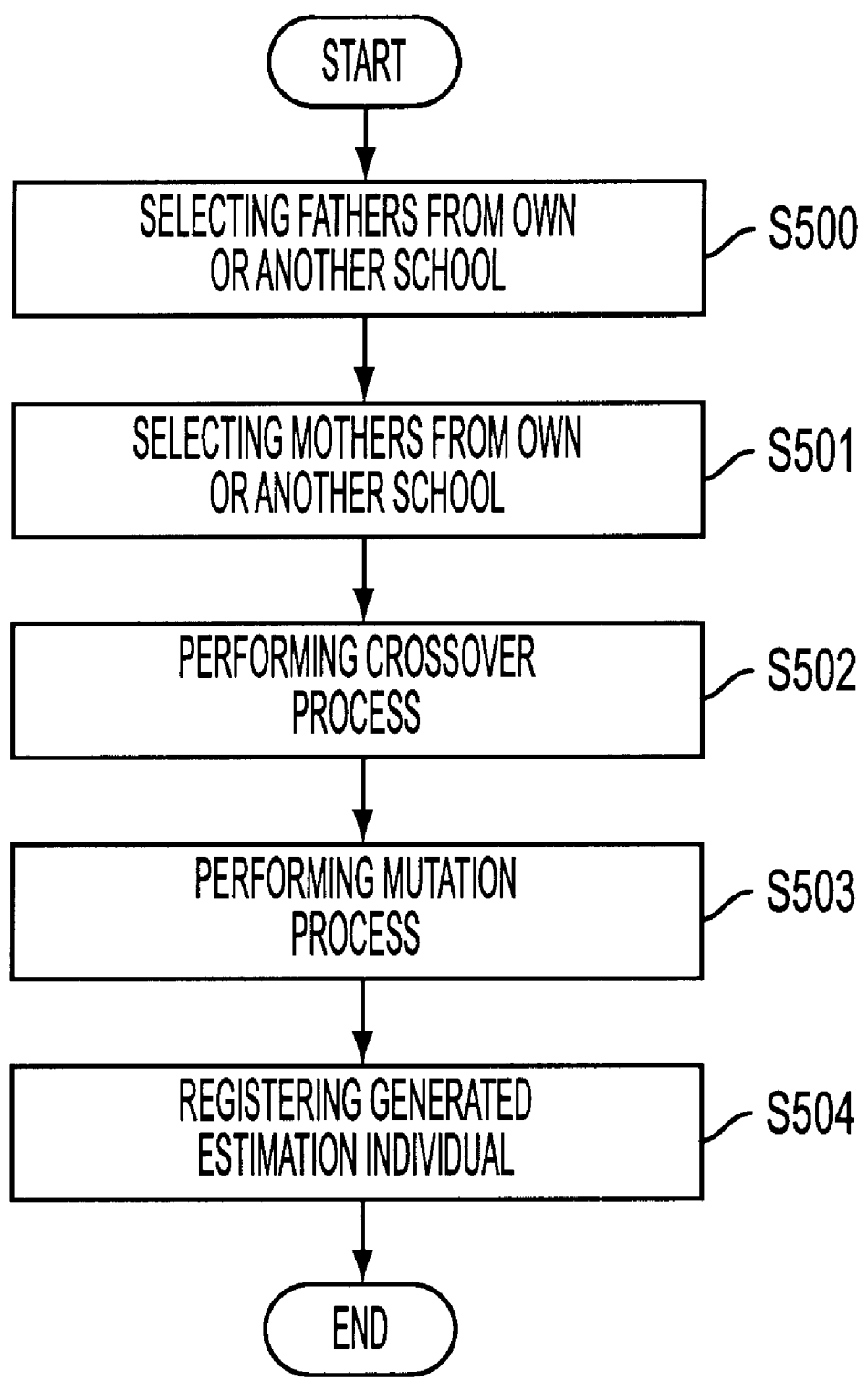
Figure 10A:
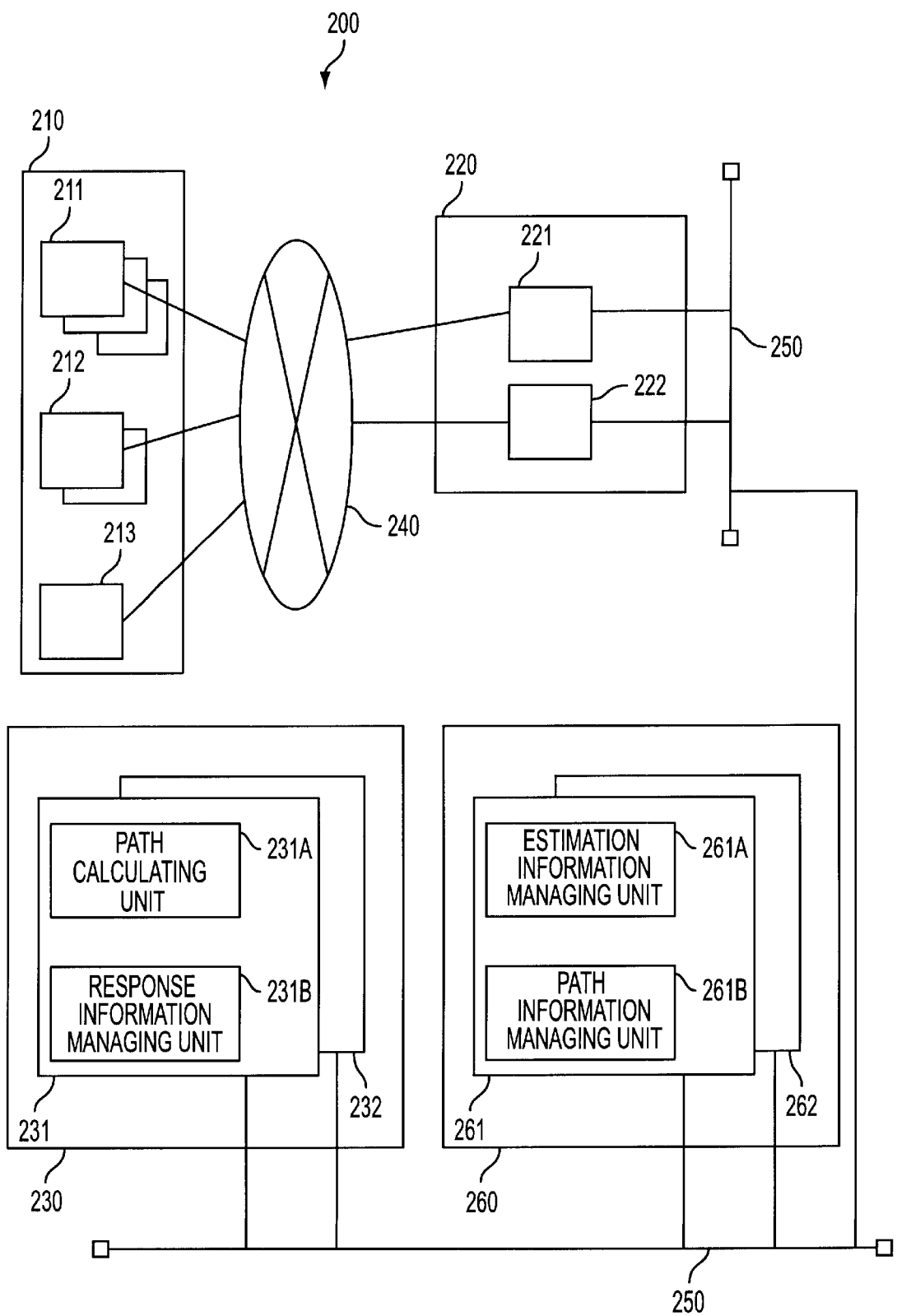
Figure 10B:
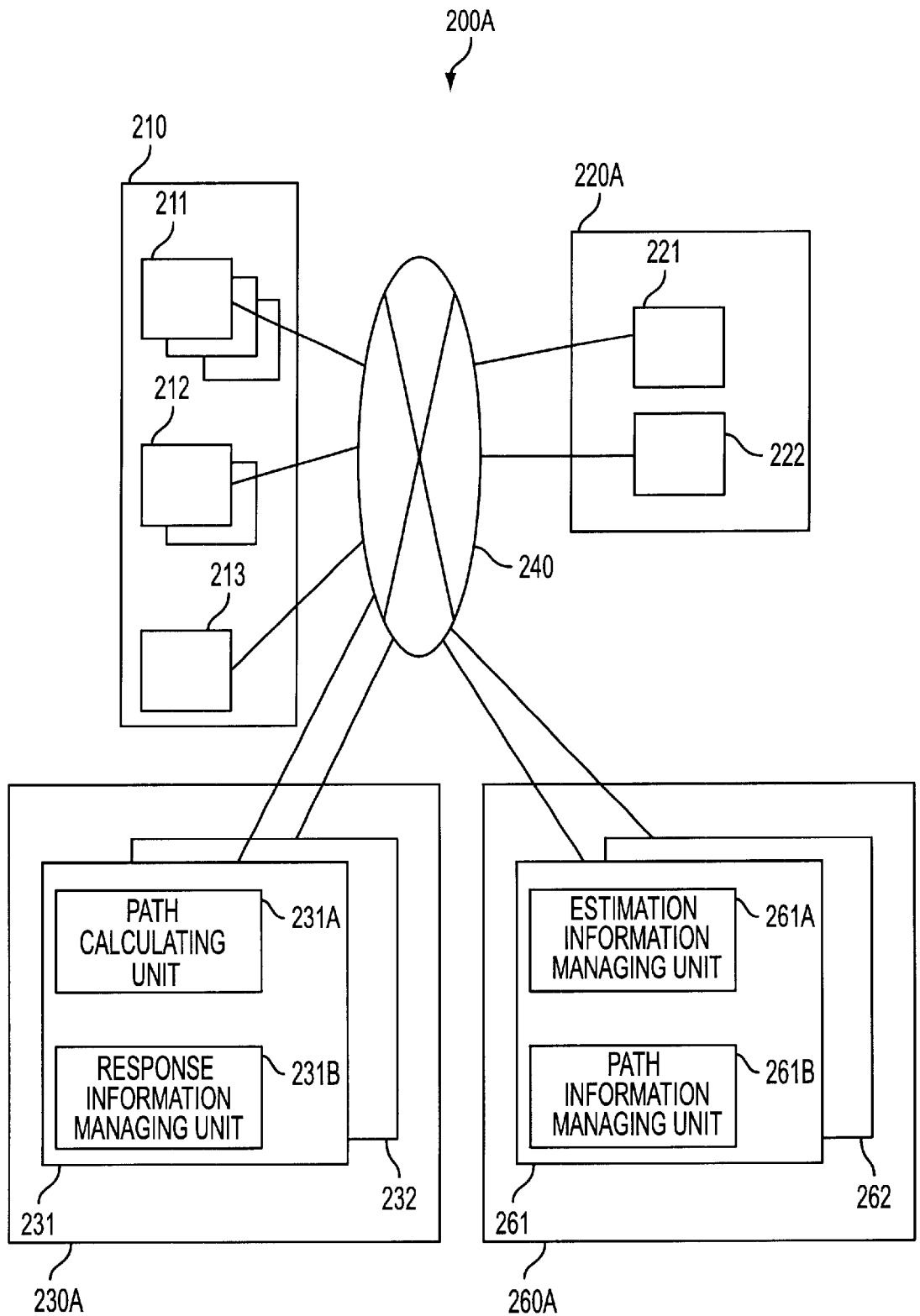
Figure 11A:
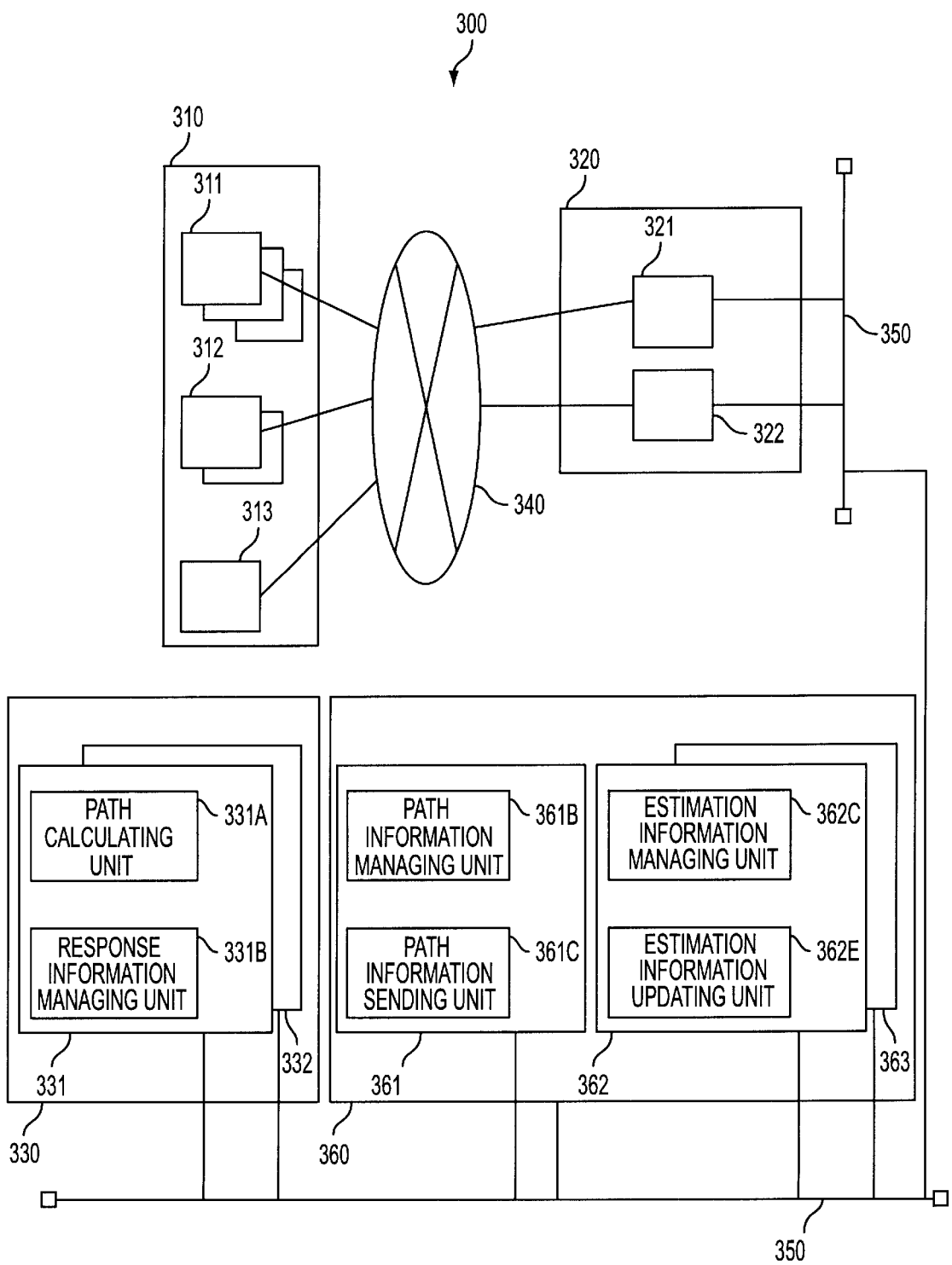
Figure 11B:
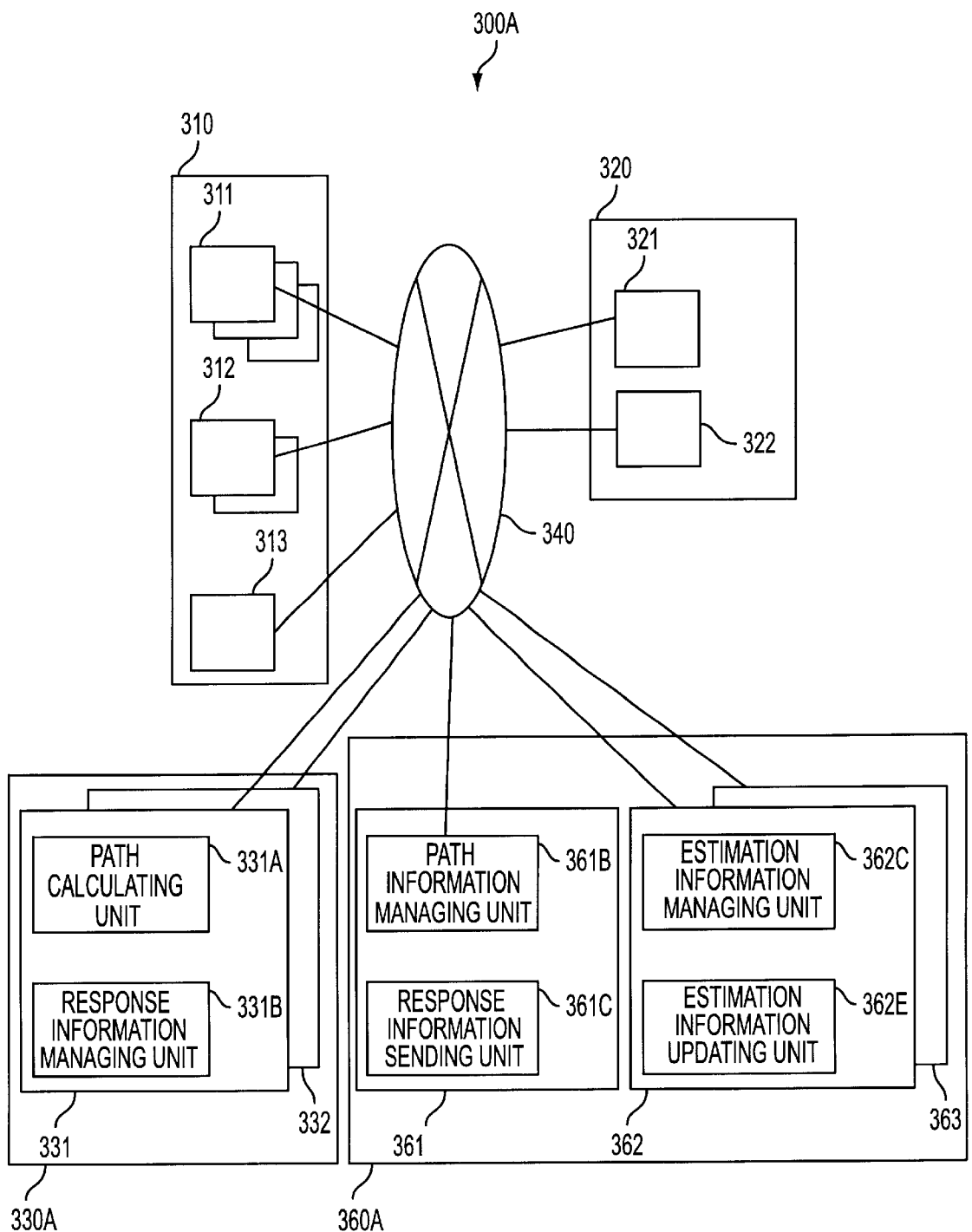
Figure 12:
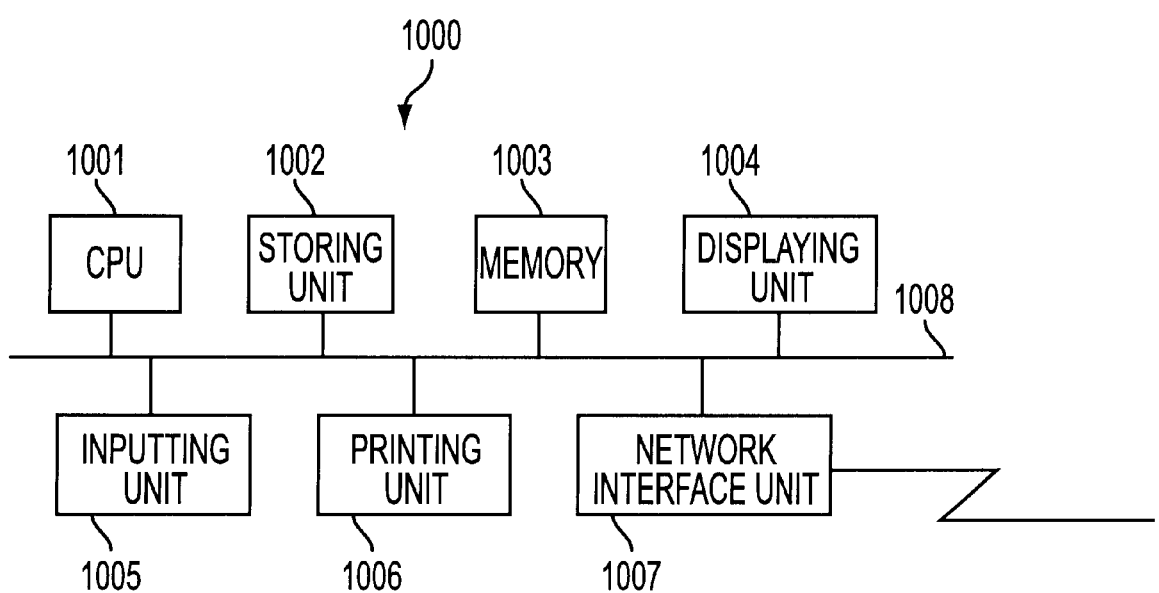

FIGS. 3A and 3B exemplify the records included in a PROXY table and a WWW server table;

FIGS. 4A and 4B show the formats of records included in an estimation individual table and an actual response time table;

FIG. 5 exemplifies the structure of a gene block of a chromosome;

FIG. 6 is a flowchart showing the process for obtaining a path with the minimum estimated response time;

FIG. 7 is a flowchart showing the process for updating an estimation individual;

FIG. 8 is a flowchart showing the process for alternating generations;

FIG. 9 is a flowchart showing the process for generating an estimation individual in a school;

FIGS. 10A and 10B are block diagrams showing the configuration of a computer network 200 to which a path selecting apparatus according to a second preferred embodiment of the present invention is applied;

FIGS. 11A and 11B are block diagrams showing the configuration of a computer network 300 to which a path selecting apparatus according to a third preferred embodiment of the present invention is applied; and FIG. 12 is a block diagram showing the hardware configuration of a client computer 1000.

DESCRIPTION OF THE PREFERRED EMBODIMENTS

Provided below are the explanations about preferred embodiments according to the present invention, by referring to the drawings. The same or similar portions shown in the drawings are denoted with the same reference numerals or symbols.

Figure 1A:
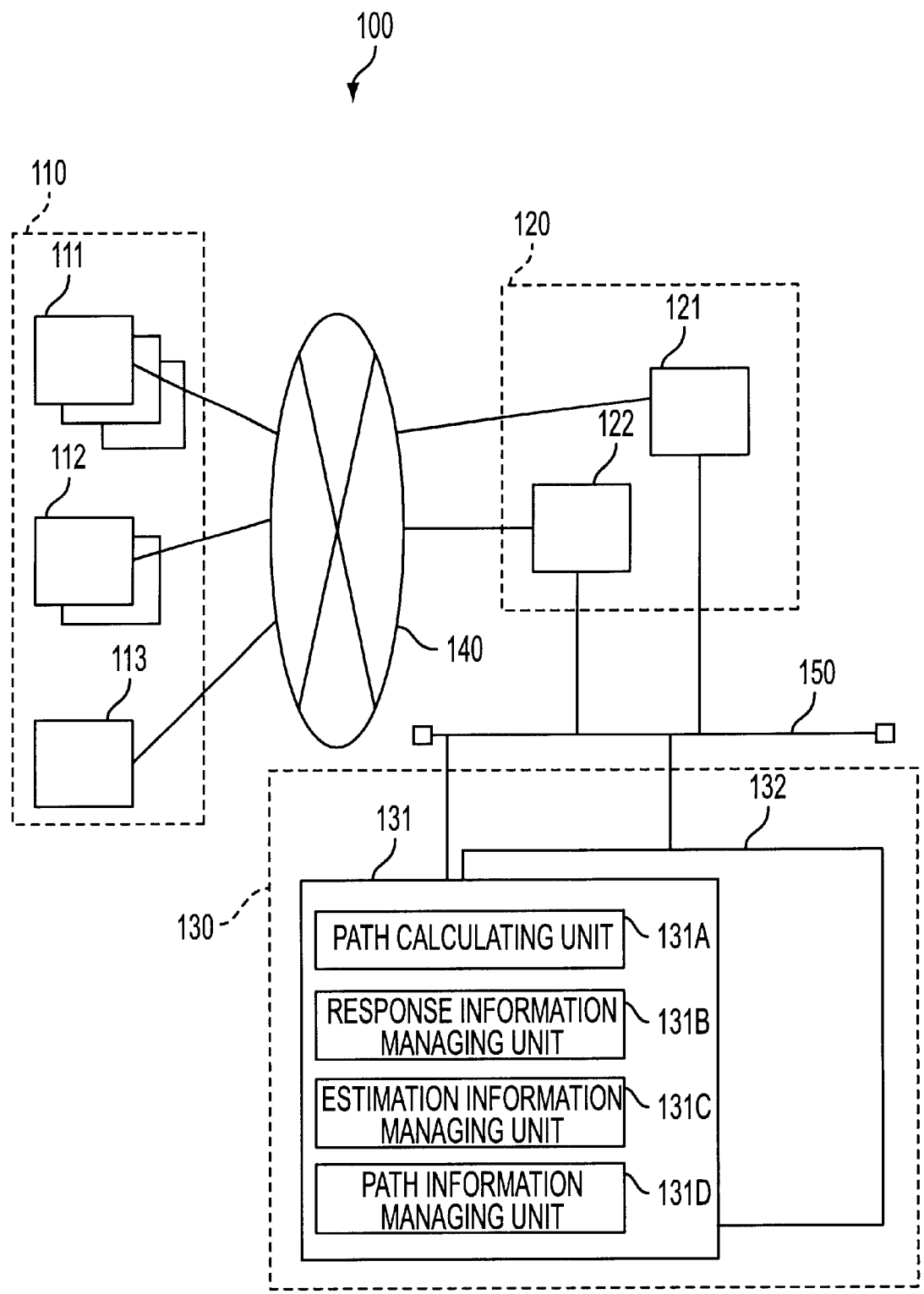
FIGS. 1A and 1B are block diagrams showing the configuration of a computer network 100 to which a path selecting apparatus according to a first preferred embodiment of the present invention is applied.
Figure 1B:
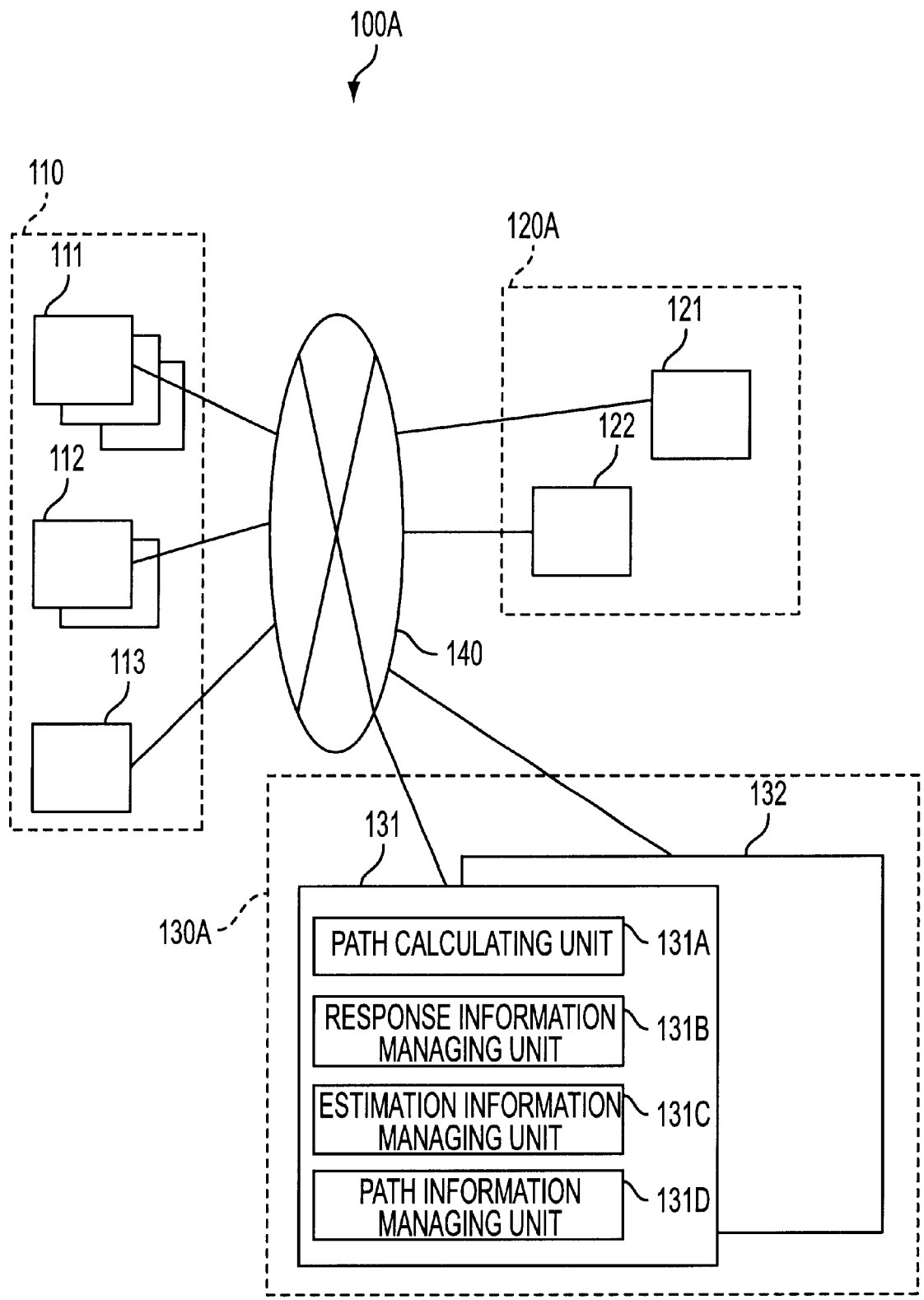

FIGS. 1A and 1B are block diagrams showing the configuration of two computer networks 100 and 100A to which a path selecting apparatus according to a first preferred embodiment of the present invention is applied. As shown in FIG. 1A the computer network 100 comprises a service providing server group 110, a PROXY server group 120, a client group 130, a wide area network (WAN) 140 including many network repeaters, such as the Internet, etc. and a local area network (LAN) 150. Both the service providing server group 110 and the PROXY server group 120 are connected to the network 140. The client group 130 is connected to the PROXY server group 120 via the LAN 150 so that it can selectively use the PROXY server group 120. As shown in FIG. 1B the client group 130A may be directly connected to the network 140 not via the PROXY server group 120A.

FIG. 1A shows one segment system composed of the PROXY server group 120, the client group 130, and the LAN 150. Actually, segment systems are connected to the wide area network 140.

The service providing server group 110 is composed of servers 111, 112, 113, . . . etc., each of which is connected to the network 140. The service providing server group 110 also offers mirror servers. For example, the server 111 includes two mirror servers, while the server 112 includes one mirror server. A mirror server is a server for storing data which is stored by another server and copied as it is. For example, mirror servers which store identical data are located at sites on the Internet. As is often the case, the mirror server is installed in order to reduce a network load by distributing server accesses simultaneously made by many client groups 130, and to prevent the concentration of accesses to a server at a popular WWW (World Wide Web) or FTP (File Transfer Protocol) site.

The PROXY server group 120 is composed of servers 121, 122, etc., each of which is connected to the network 140. A PROXY server has a "firewall" capability for protecting the information assets in an internal network such as an enterprise network from an external network such as the Internet, etc., to which anyone can make an access; and a "proxy server" capability for accepting a service request issued from a client in the internal network to the external network, and for processing the request instead. By using the PROXY server, the client in the internal network can access the external network and can request services provided by the servers in various external networks, etc. via the PROXY server without being conscious of the existence of a firewall. Additionally, the PROXY server has also the capability for caching the data to which an access has been recently made or the data to which accesses are frequently made. When the client group 130 accesses those data, the PROXY server returns the data stored in its own cache memory without accessing the service providing server group 110 via the network 140. In this way, the client group 130 can obtain desired data from the PROXY server group 120, thereby reducing the entire traffic of the network 140, and speeding up the response to the client group 130.

The client group 130 is composed of clients 131, 132, . . . etc. A user issues a service request from the client group 130 to the service providing server group 110 via the PROXY server group 120 and the network 140. As a most typical example, the process where an HTML file, etc. stored in the service providing server group 110 is downloaded from a WWW browser included in the client group 130 and a desired home page is displayed on the screen of the user in the client group 130, can be cited. In this case, the service providing server group 110 serve as WWW servers. A WWW server is also referred to as a web server. In the WWW server, a daemon process called "httpd (hyper text transfer protocol daemom)" is invoked according to a request transmitted from a WWW browser of a client by using an "http" protocol. With this process, requested data such as an HTML (Hyper Text Markup Language) file describing a home page, an image file to be used as a part, etc. are transmitted to the WWW browser of the client.

The client group 130 makes an access to the service providing server group 110 via the PROXY server group 120 in most cases as shown in FIG. 1A. However, the client group 130A can make this access not via the PROXY server group 120A as shown in FIG. 1B.

Note that the client group 130 referred to in this specification must be construed as indicating both the client group 130 and individual clients 131, 132, . . .

Each of the clients, for example, the client 131 includes a path calculating unit 131A, a response information managing unit 131B, an estimation information managing unit 131C, and a path information managing unit 131D. Also the client 132 includes units (path calculating unit 132A, response information managing unit 132B, an estimation information managing unit 132C, and a path information managing unit 132D) similar to those of the client 131, although they are not shown in FIGS. 1A and 1B. Also other clients have similar units.

Here, the respective units included in the client group 130 are explained by taking the client 131 as an example. The path calculating unit 131A determines an optimum communication path from the client 131 to a transmission destination (mirror server) by using the estimated information provided by the estimation information managing unit 131C, an actual response time, and mirror and PROXY server names provided by the path information managing unit 131D; and transmits a desired service request over the determined path.

Upon receipt of the response to the service request transmitted by the path calculating unit 131A, the response information managing unit 131B stores the information about the response such as the actual response time, etc., and provides the estimation information managing unit 131C with the stored information.

The estimation information managing unit 131C provides the latest estimated information to the path calculating unit 131A according to the request made by it, and updates the estimated information upon receipt of the information such as the actual response time, etc. from the response information managing unit 131B.

The path information managing unit 131D stores the information such as the mirror and PROXY server names, etc., and provides these items of information according to the request made by the path calculating unit 131A.

The path that we consider here is the path fundamentally obtained by linking the path (going path) on which the client group 130 transmits a request to the service providing server group 110 and the path (returning path) on which the service providing server group 110 transmits a response to the client group 130. Normally, the start and end addresses of the path are identical. However, the process where the client group 130 transmits a service request and the process where the client group 130 receives a response are mutually independent. If different client groups 130 respectively perform these processes, the start and end addresses may sometimes differ. Note that the start and end addresses of the path are different although the path substantially serves as both the going and returning paths in such a case.

For the service request to be issued to a WWW server, the going and returning paths of the request message are normally identical. That is, a response is returned by inversely tracing the path on which the client group 130 transmits the request to the service providing server group 110. However, because the going and returning paths may be sometimes different, it is desirable that the path is handled as the one obtained by linking the going and returning paths.

Figure 2:
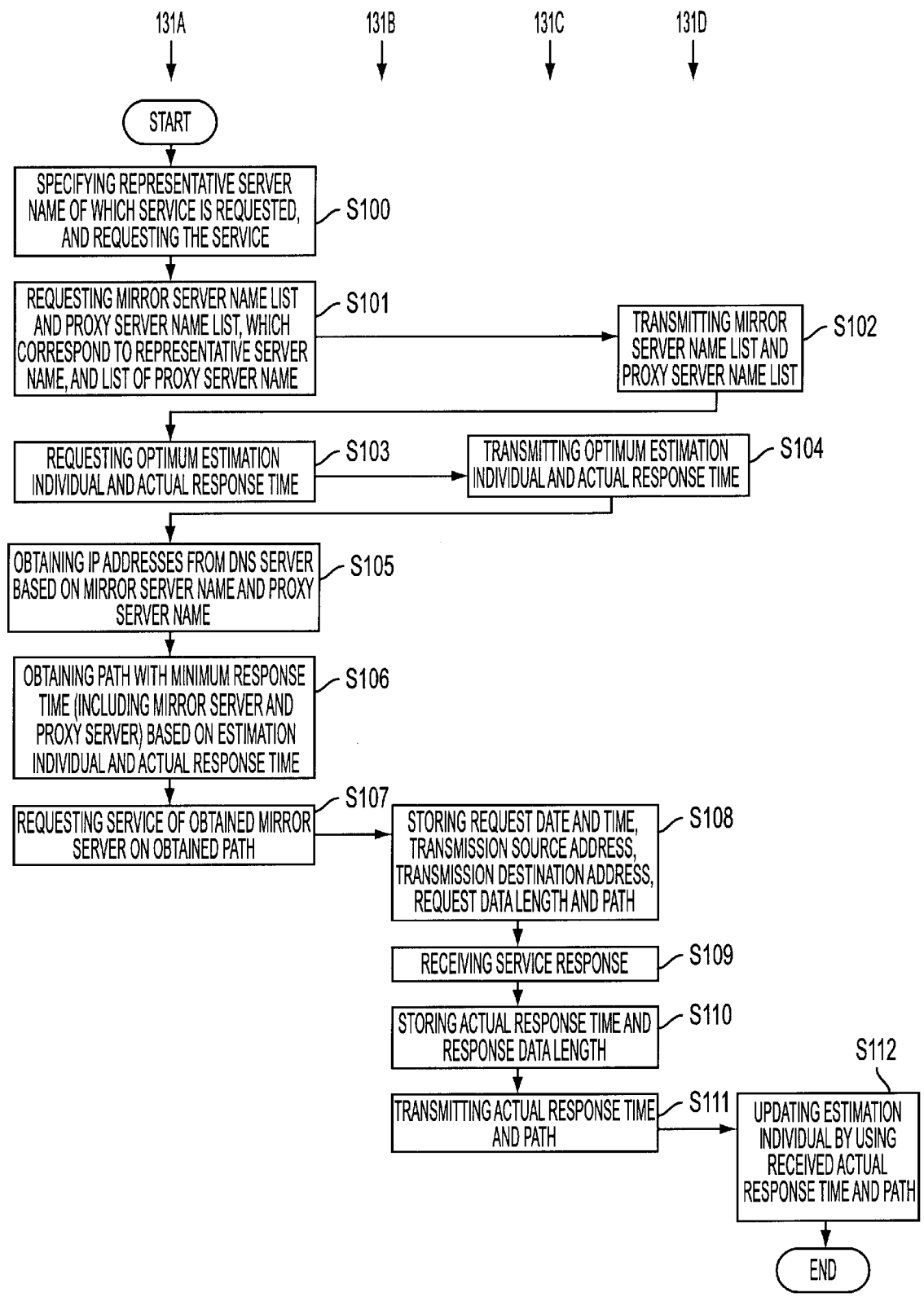
FIG. 2 is a flowchart showing the process performed by a client.

Provided next is the explanation about the entire process flow of the client 131, by referring to the flowchart shown in FIG. 2. This preferred embodiment adopts a genetic algorithm (GA) in order to estimate an optimum path. Such an estimate is an element belonging to a category recognized as being what is called a "combinatorial optimization problem". Therefore, the true object of the present invention must be understood not as the GA but as the contents recited in claims. According to this preferred embodiment, use of the GA eliminates the need for making the calculation which is conventionally performed based on all of environment data each time a path is selected. It is sufficient only to calculate bit by bit a difference of an estimation individual (estimate parameter), which occurs due to a network environment change.

According to this preferred embodiment, with the GA, an estimation individual corresponding to an ever-changing network environment (due to such as a line disconnection, a line extension, an increase or decrease of the number of users, a change of service popularity, etc.) is prepared by alternating the generation of the estimation individual each time the network environment change information (such as newly measured response time data) is obtained.

For each newly generated estimation individual, genes (chromosomes) are set to be adaptable for various environment changes. Namely, use of the GA allows the system according to this preferred embodiment to be adapted by estimating every future change pattern depending on need as its environment changes. Note that, however, the crossover and mutation operations suitable for the estimation individual must be performed in order to estimate every change.

FIG. 2 is a flowchart showing the process performed by a client. The process is described by being divided into respective sequences of steps for the above described units (the path calculating unit 131A, the response information managing unit 131B, the estimation information managing unit 131C, and the path information managing unit 131D). For example, the steps described in the leftmost sequence (steps S100, S101, etc.) are to be performed by the path calculating unit 131A, while the step (S102) described in the rightmost sequence are to be performed by the path information managing unit 131D. Here, the request from each of the clients 131, 132, . . . can be transmitted by passing through one of the PROXY servers 121, 122, . . . in order to make the request to the service providing server group 110, which is assumed to be composed of mirror servers.

For example, if the client 131 first specifies an address of a desired home page in order to view the page with a WWW browser, etc., the path calculating unit 131A issues a service request, that is, the request to download the HTML file describing the specified home page and its associated data to a representative server name at that address (step S100.

Then, the path calculating unit 131A requests a mirror server name list and a PROXY server name list, which correspond to the representative server name, of the path information managing unit 131D within the client 131 (step S101). FIG. 3A exemplifies records included in a PROXY table 160, in which the respective records 161, 162, 163, etc. store the PROXY server names associated with the client 131. FIG. 3B exemplifies records included in a WWW server table 170, in which the respective records 171, 172, 173, . . . store the representative names of WWW servers and the mirror server names corresponding to the servers. In the example shown in this figure, mirror servers "www1.BBB.com", "www2.BBB.com", and "www3.BBB.com", which correspond to a server named "www.BBB.com", are stored. A service request can be made to one of these four servers. It is desirable that both of the tables 160 and 170 are arranged in a memory of each of the clients 131, 132, . . . However, they may be arranged onto an external storage device of each of the clients 131, 132, . . . , or may be arranged in a suitable database server of this system, which is not shown in this figure, for share use of the clients 131, 132, . . .

The path information managing unit 131D, to which the path calculating unit 131A issues a request for the mirror server name list and the PROXY server name list, which correspond to the representative server name, transmits to the path calculating unit 131A the mirror server name list and the PROXY server name list, which can satisfy this service request (step S102). If the service providing server which transmits the service request does not have a mirror server or if the client 131 makes an access not via a PROXY server, an access to the PROXY table 160 or to the WWW server table 170 is not required.

Next, the path calculating unit 131A requests an optimum estimation individual and an actual response time of the estimation information managing unit 131C (step S103). The path calculating unit 131A can adjust the timing at which it requests the estimation individual of the estimation information managing unit 131C according to a lifespan or a degree of fitness of the estimation individual in consideration of a communication load, etc. There is no need to always make this request in step S103. Upon receipt of the request, the estimation information managing unit 131C searches an estimation individual table 180 and an actual response time table 190, which will be described later, and transmits the necessary records to the path calculating unit 131A (step S104).

FIG. 4A shows the format of a record 181 of an estimation individual included in the estimation individual table 180, while FIG. 4B shows the format of a record 191 included in the actual response time table 190. These tables are normally arranged in a database server in the computer network 100, and can be referenced and updated by each of the clients 131, 132, . . .

As shown in FIG. 4A, the record 181 of each estimation individual in the estimation individual table 180 includes an identification number, an address location, the degree of fitness, a lifespan, a generation date and time, a chromosome length, and genes 182 (8 blocks from 0 to 7) structuring a chromosome.

The identification umber is a unique number for identifying an estimation individual.

The address location stores the address information indicating from where the record 181 of the estimation individual starts in the estimation individual table 180.

The degree of fitness is a degree for determining how accurately the response time of a service request that the client group 130 issues to the service providing server group 110 can be estimated. In the genetic algorithm, an estimation individual with a higher degree of fitness survives with a higher probability, so that an estimation individual group of a next generation will be formed by centering the estimation individual with the higher degree of fitness.

The degree of fitness used in this embodiment is represented by the following equation.

$$Degree\ of\ Fitness = \left(\sum_{i=1}^{N} RIR_i\right) / \left(\sum_{i=1}^{N} (dRT_i + 1) \times RIR_i\right) \quad (1)$$

where "RIR" (Recency Influence Rate) is a most recent influence rate, and "$RIR_i$" is an index indicating how much difference exists between the time at which an "i"th actual response time is measured and the time at which the degree of fitness is calculated. "$RIR_i$" is represented by $$RIR_i = e^{(-C1 \times cnew \times TAi)}$$

where "C1" is a positive constant, and "$TA_i$" is a value obtained by subtracting the time at which the "i"th actual response time is measured from the time at which "$RIR_i$" is used. "cnew" will be described later. "$dRT_i$" is an absolute value of the difference between the estimated response time of the time point at which the "i"th actual response time is measured and the actual response time.

If all of "$dRT_i$"s are "0", that is, if the actual response time matches the estimated response time at each measurement time, the degree of fitness becomes "1", which is the highest. The closer the values of "$dRT_i$"s are to "0", that is, the larger the number of cases where the difference between the actual response time and the estimated response time is small at each measurement time, the closer the value of the degree of fitness is to "1". This means that the estimation individual with a higher degree of fitness has more superior genes. Consequently, the closer the degree of fitness of an estimation individual is to "1", the more superior the genes of an estimation individual are.

The lifespan is represented by the following equation.

lifespan=(the value of the degree of fitness of an estimation individual–a minimum value of the degree of fitness in a school)/ (1–the minimum value of the degree of fitness in the school)×a maximum value of a lifespan in the school where the school is a subset of an estimation individual set (referred to as a population domain). The alternation of generations is performed in school units, and an estimation individual with a lower degree of fitness is selected. The estimation individual set, that is, the population domain, is a range where genes are crossed over. The number of schools can be arbitrarily determined depending on the degree of attainment of the growth which varies according to the scale of the generation alternation process, and on a process load, etc.

As is apparent from the above described explanation of the equation (1), if 0<degree of fitness≦1 and if the degree of fitness of an estimation individual is the minimum value in a school, the value of the lifespan of the estimation individual will become "0". The closer the degree of fitness of an estimation individual is to the maximum value in a school, the larger the value of the lifespan of the estimation individual is. That is, the value of the lifespan of the estimation individual becomes larger as the degree of fitness of the estimation individual is closer to "1". The estimation individual is deleted as the one whose lifespan expires if it satisfies the condition:

"the generation date and time of an estimation individual+its lifespan<current date and time"

Therefore, the larger the value of the lifespan of the estimation individual is, the longer the individual stays in the school.

The generation date and time indicate the date and time when an estimation individual is generated.

The chromosome length indicates the length of a chromosome structured by gene blocks (schemas). According to this preferred embodiment, the gene blocks are defined to be coefficients, which will be described in detail later. It may be added with another coefficient or be replaced with another coefficient. The chromosome length indicates the length of the entire chromosome in such a case, thereby easily performing gene operations with an application, etc.

The chromosome is composed of 8 gene blocks (schemas) 0 through 7, each of which has a data format defined, for example, by an "int" type of Java. Used in this embodiment are the gene blocks 0, 1, and 4 through 7. To these gene blocks 0, 1, and 4 through 7, and the remaining unused gene blocks 2 and 3, arbitrary values can be assigned in order to preferably make an estimation individual evolve.

FIG. 5 exemplifies the structure of the gene blocks 182 forming a chromosome.

In this example, the following values are assigned to the gene blocks 0, 1, and 4 through 7.

Gene block 0: a most recent influence coefficient (cnew)

The most recent influence coefficient is used to calculate the above described recent influence rate "RIR". This coefficient is an index indicating how much the difference between the time at which the actual response time is measured and the time at which "RIR" is calculated influences the degree of fitness.

Gene block 1: a distance influence coefficient (cdist)

The distance influence coefficient is used to calculate a distance influence rate "DIR". This is an index indicating how the distance between the client group 130 and the service providing server group 110 influences the degree of fitness. "DIR" is used to calculate an estimated response time to be described later.

Gene blocks 4 through 7: distance influence coefficients (csnet1 through csnet4)

IP addresses are divided into 4 groups in 8 bits by being delimited with periods. The gene blocks 4 through 7 are indices indicating the degrees of influence of the distance between the client group 130 and the service providing server group 110 on each of the groups. The distance influence coefficient (csnet1) of the gene block 4 indicates the influence of the distance on the first leftmost 8-bitgroup of the IP addresses. The distance influence coefficient (csnet2) of the gene block 5 indicates the influence of the distance on the second left 8-bitgroup of the IP addresses. The distance influence coefficient (csnet3) of the gene block 6 indicates the influence of the distance on the third left 8-bitgroup of the IP addresses. The distance influence coefficient (csnet4) of the gene block 7 indicates the influence of the distance on the last 8-bitgroup of the IP addresses.

These distance influence coefficients of the gene blocks 4 to 7 are used to calculate an inter-subnetwork distance influence coefficient "DE", which is used to calculate the "DIR".

The above described gene blocks 0 through 7, which are schemas structuring a chromosome, are first set at random with a "Random" function, etc. Thereafter, they will grow according to a genetic algorithm, so that they will evolve into an optimum bit string.

As shown in FIG. 4B, the record 191 of the actual response time table 190 includes an identification number, a transmission source address, a transmission destination address, a path, an actual response time, a request data length, a response data length, and a request date and time.

The identification number is a unique number for identifying the record of the actual response time.

The transmission source address is an address of the client group 130 which issues a service request.

The transmission destination address is an address of the transmission destination address to which the client group 130 issues the service request, that is, the address of the service providing server group 110.

The path indicates the path on which the client group 130 transmits the message for requesting the service to the service providing server group 110, and the path on which the service providing server group 110 transmits the message for responding to the request to the client group 130. It stores the identification information of all of the passed-through nodes such as a router, a server, etc. In this specification, the term simply referred to as a path includes both its ends, that is, the transmission source address and the transmission destination address. Since the record 191 includes the transmission source address and the transmission destination address, these items of node address information may not be included if the address of a transmission source node and that of a transmission destination address are identical.

The actual response time is an amount of time per unit data length, which is actually required for transmitting the response to the service request from the service providing server group 110 to the client group 130, after the client group 130 issues the service request to the service providing server group 110. The actual response time (RT) is represented by the following equation.

$$RT = (2 \times RTraw)/(Lreq + Lres)$$

where "RTraw" is the amount of time, which is actually required for transmitting the response to the service request from the service providing server group 110 to the client group 130, after the client group 130 issues the service request to the service providing server group 110. "Lreq" is a request data length, and "Lres" is a response data length. Namely, the actual response time "RT" indicates the amount of time required for exchanging the data whose length is (Lreq+Lres) between the client group 130 and the service providing server group 110. The unit of the actual response time "RT" is, for example, msec/bit.

The request data length "Lreq" is the length of the message for issuing the service request from the client group 130 to the service providing server group 110. The length of this message, such as the message for instructing a home page display or the message for instructing downloading of a file according to an FTP, may be short in most cases.

The response data length "Lres" is the length of the message transmitted from the service providing server group 110 to the client group 130 in response to the service request issued from the client group 130. The length of this message, such as the message for responding to the instruction of a home page display or the message for responding to the instruction of downloading of a file, may significantly vary depending on the size of the home page or the file. Especially, the length of the message for responding to the downloading instruction may sometimes be of several megabytes.

Because the actual response time "RT" includes the information of the request data length and the response data length, these items of information need not be stored in the actual response time table 190. However, they are reserved for future expansion, etc. here. If such information inclusion is not desirable from a data capacity viewpoint, these two items of information, that is, the request data length and the response data length may be excluded from the actual response time table 190.

The request date and time is the date and time when the client group 130 issues a service request to the service providing server group 110. When the degree of fitness or an estimated response time to be described later is calculated, the data of the actual response time is used. However, the signification of the data of the actual response time varies depending on whether the time at which the data of the actual response time is obtained is either before or after the time at which the calculation is made. Therefore, the request date and time is an important element in this preferred embodiment according to the present invention.

Turning back to step S105 of FIG. 2. In this step, the path calculating unit 131A obtains corresponding IP addresses based on the mirror and PROXY server names. If the mirror server and the PROXY server are known to the client group 130, the information of the IP addresses are normally stored in its memory, etc. Therefore, the IP addresses can be obtained from the memory, etc. If the IP addresses are new (unknown) to the client group 130, the addresses corresponding to the mirror server and the PROXY server can be obtained by accessing the table stored in a DNS (Domain Name System) server in a predetermined domain.

Next, possibly available paths between mirror servers and PROXY servers are considered. The estimated response time for each of the paths is then obtained based on the estimation individual and the actual response time, which are obtained from the estimation information managing unit 131C, and the path with the minimum estimated response time is selected (step S106). The obtained path is the path including the mirror server and the PROXY server. Note that the path calculating unit 131A must know at least one of the possibly available paths between the mirror server and the PROXY server. Fortunately, this unit can collect the information of at least one available path with a method adopted by a conventional routing protocol.

Then, the path calculating unit 131A issues a service request to the service providing server group 110 by using the obtained path including the mirror server and the PROXY server (step S107), and passes control to the response information managing unit 131B. At this time, the response information managing unit 131B stores in the actual response time table 190 the request date and time when the client group 130 makes the service request, the request data length, the transmission source address, the transmission destination address, and the path selected in step S106 as new records (step S108).

Next, the response information managing unit 131B receives the response to the service request from the service providing server group 110 (step S109). Upon receipt of the response, a predetermined application, etc. performs a necessary process in order to provide a user with the service, although this is not shown in FIG. 2. For example, upon receipt of the response to the request for instructing a home page display, a WWW browser, etc. displays the home page by stages according to the received data. Or, upon receipt of the response to the request for instructing downloading of a file according to an FTP, etc., an FTP program downloads the file and displays the reception status of the response data in real time.

Upon receipt of the entire response to the service request from the service providing server group 110, the response information managing unit 131B stores the actual response time and the response data length of the service in the actual response time table 190 in addition to the records, which is newly generated in step S108 (step S110). Then, the response information managing unit 131B transmits the actual response time and the path stored in step S108 to the estimation information managing unit 131C (step S111).

Upon receipt of the actual response time and the path from the response information managing unit 131B, the estimation information managing unit 131C updates the estimation individual based on the received information (step S112).

FIG. 6 is a flowchart showing the process for obtaining a path with the minimum estimated response time. This figure shows the details of step S106 of FIG. 2. In step S106, possibly available paths between a mirror server and a PROXY server are obtained, the estimated response time is obtained for each of the paths based on the estimation individual and the actual response time, which are obtained from the estimation information managing unit 131C, and the path with the minimum estimated response time is selected.

The path calculating unit 131A first obtains a list of possibly available paths from the mirror server name list and the PROXY server name list (step S200). Then, the path calculating unit 131A selects the first path from the path list (step S201). Next, the path calculating unit 131A obtains the estimated response time of each of the paths obtained in step S200 by using the estimation individual and the actual response time, which are provided from the estimation information managing unit 131A (step S202). The actual response time at this time is normally actual response times obtained from records having identical paths in the actual response time table 190. If the number of pieces of data whose actual response times are the same as that of the selected path is insufficient, that is, if the number of records whose actual response times are the same as that of the selected path is quite small in the actual response time table, the estimated response time can be obtained by using more of the records 191 of the actual response times whose paths resemble the selected path, or more of the most recent records 191 of the actual response time, etc. than those used for the case of the same path.

For example, if the actual response time was previously calculated for the same path as the selected path, 5 pieces of the actual response time data are used to calculate the estimated response time. If no actual response time has been measured for the same path as the selected path, 10 pieces of the most recent actual response time data are used to calculate the estimated response time regardless of paths.

The equation for obtaining the estimated response time is as follows:

$$\text{Estimate Response Time} = \left(\sum_{i=1}^{N} RIR_i \times DIR_i \times RT_i\right) / \left(\sum_{i=1}^{N} RIR_i \times DIR_i\right) \quad (2)$$

where "$RIR_i$" is the most recent influence rate of an "i"th selected path, and its content is described above. "$DIR_i$" is the distance influence rate for the "i"th selected path, which is represented by the following equation $$DIR_i = 1/(C2 \times e^{-C3 \times cdist} \times DE_i + 1)$$

where "C2" and "C3" are positive constants, "cdist" is the distance influence coefficient, and "$DE_i$" is the degree of influence of the distance evaluated by an IP address. This is called an inter-subnetwork distance influence coefficient. For the selected path, assume that the number of each node on the path is "j", and the number of nodes on the path, which includes path servers such as the client group 130, the PROXY server group 120, etc., and the service providing server group 110, is "M". Also assume that the 8-bitgroups of IP addresses at the respective nodes on the path whose estimated response time is to be obtained are "$T_{1j}$", "$T_{2j}$", "$T_{3j}$", and "$T_{4j}$" from the left; and the 8-bitgroups of IP addresses at the respective nodes on the path which is actually used to obtain the actual response time used for making an estimate are "$R_{1ij}$", "$R_{2ij}$" "$R_{3ij}$", and "$R_{4ij}$" from the left. At this time, "$DE_i$" can be represented by the following equation (3):

$$DE_i = \sum_{k=1}^{4} \left( C_k \times \sum_{j=1}^{M} |R_{kij} - T_{kj}| \right) \quad (3)$$

where $C_k = e^{-C4 \times csnetk}$.

Note that "C4" is a positive constant, and "csnetk" varies from "csnet1" to "csnet4" depending on the value of "k". These values signify the weights of the distances of the four 8-bitgroups of IP addresses as described above. If two IP addresses are compared in the four 8-bitgroup units with the above described equation (3), the difference between the groups on the left side is considered to be larger than that between the groups on the right side in terms of the distances (namely, the difference between groups which are closer to the left is larger). Therefore, "csnet4", "csnet3", "csnet2", and "csnet1" normally have a larger value in this order.

Furthermore, the number of repeaters on two compared paths may sometimes differ. In such a case, the numbers of repeaters on the two paths are made identical by temporarily setting a suitable address at a suitable location on the path with a smaller number of repeaters. As a result, the equation (3) becomes available in this case.

"$RT_1$" is the actual response time of the "i"th selected path.

Next, it is determined whether or not the value of thus obtained estimated response time is smaller than the estimated response time minimum value (step S203). The initial value of the estimated response time minimum value is a large value such as an infinite number, etc. If the value about the estimated response time is smaller than the estimated response time minimum value ("YES" in step S203), the currently selected path is set as the path with the minimum estimated response time (step S204). Normally, the information for identifying that path is stored in a predetermined area. Then, the value of the obtained estimated response time is assigned to the estimated response time minimum value (step S205), and the process goes to step S206. Because the initial value about the estimated response time minimum value is extremely large, the calculation of the first estimated response time always experiences these steps.

If the value about the estimated response time is equal to or larger than the estimated response time minimum value ("NO" in step S203), the process goes to step S206 of a determination process, where it is determined whether or not any path yet to be processed is left in the path list obtained in step S202. If "YES" in step S206, the next path is selected from the path list (step S208) and the process goes back to step S202. If no path yet to be processed is left ("NO" in step S207), an optimum path is determined (step S207) and the process is completed. Namely, the path set as the one with the minimum estimated response time is determined to be an optimum path when the process goes to step S207. In this case, the estimated response time minimum value is the estimated response time of that optimum path.

FIG. 7 is a flowchart showing the process for updating an estimation individual. This figure shows the details of step S112 of FIG. 2. Upon receipt of the actual response time and its path from the response information managing unit 131B, the estimation information managing unit 131C updates the estimation individual based on the received information.

The estimation information managing unit 131C first determines whether or not the actual response time and the path are transmitted from the response information managing unit 131B (step S300). If "NO" in step S300, the estimation information managing unit 131C repeats this determination process. If "YES" in step S300, the estimation information managing unit 131C obtains the first estimation individual in the school associated with the client group 130 (step S301). Here, one school corresponding to the client group 130 which performs the process is targeted.

Next, the estimation information managing unit 131C obtains the estimated response time of the received path for the estimation individual within the obtained school (step S302). At this time, if the number of pieces of data whose actual response times are the same as that of the received path is insufficient, that is, if the number of records of the actual response times whose paths are the same as that of the received path is a few, an estimate can be made by using more of the records 191 of the actual response times whose paths resemble the received path, and more of the records 191 of the most recent actual response time than those used in the case of the same path.

The process of step S302 is repeated for all of the estimation individuals in the school.

The equation for obtaining the estimated response time is described above.

Furthermore, the degree of fitness and the lifespan are obtained for each of the estimation individuals from the estimated response time obtained in step S302, the actual response time obtained from the response information managing unit 131B and the actual response time stored in an arbitrary record 191 in the actual response time table 190, etc., so that the corresponding items of the corresponding record in the estimation individual table 180 are updated (step S303).

Next, it is determined whether or not any estimation individual is left in the school (step S304). If "YES" in step S304, the next estimation individual in the school is obtained and the process in and after step S302 is performed (step S306). If "NO" in step S304, the generation alternation process is performed (step S305). Then, the process goes back to step S300 where the determination process is performed.

FIG. 8 is a flowchart showing the generation alteration process. This figure shows the details of step S305 in FIG. 7. In this process flow, the alternation of generations is performed for an estimation individual in a school, which is updated with the process flow shown in FIG. 6, including an estimation individual in another school.

The estimation information managing unit 131C obtains the number of estimation individuals whose lifespans expire among the estimation individuals in the school associated with its own client 131 (step S400). If the condition "the generation date and time of an estimation individual+lifespan<current date and time" is satisfied, the lifespan is determined to have expired. If an estimation individual whose lifespan has expired dose not exist ("NO" in step S401), the generation alternation process is terminated. If even one estimation individual exists whose lifespan has expired ("YES" in step S401), an estimation individual is obtained from the estimation information managing unit 131C of the client group 130 associated with another school (step S402). This process is performed for obtaining an optimum path which is cooperative as an entire system by obtaining and involving an estimation individual in another school, and reflecting the information of another school on the generation process of a new estimation individual, which is performed in step S403.

Next, the estimation information managing unit 131C generates new estimation individuals determined by the number of estimation individuals whose lifespans have expired from the estimation individuals in the school associated with its own client and the estimation individuals in another school (step S403). After the new estimation individuals are generated, the estimation individuals whose lifespans have expired are deleted (step S404). The process is then completed.

FIG. 9 is a flowchart showing the process for generating an estimation individual in a school, and the details of step S403 shown in FIG. 8. In this process flow, a new estimation individual is generated by performing crossover and mutation operations for estimation individuals in the school associated with its own client or estimation individuals in another school according to a genetic algorithm.

The estimation information managing unit 131C first selects fathers whose number is the same as that of the estimation individuals whose lifespans are determined to have expired in step S401, from the estimation individuals in the school associated with its own client or from the estimation individuals in another school (step S500). Similarly, the estimation information managing unit 131C selects mothers whose number is the same as that of the estimation individuals whose lifespans are determined to have expired in step S401, from the estimation individuals in the school associated with its own client or from the estimation individuals in another school. At the time of these selection operations, an estimation individual with a higher degree of fitness is fundamentally selected with higher probability. As a result, estimation individuals which will become fathers or mothers are selected regardless of their own schools. The estimation individuals from their own schools must be left to some extent in order to biologically improve the degree of fitness to their own environments.

Next, the crossover operation is performed between these two estimation individuals as a father and a mother (step S502). In this example, one half of the estimation individuals (that is, the estimation individuals whose number is the same as that of the estimation individuals whose lifespans are determined to have expired) are generated from the father and mother estimation individuals (namely, their total is double the number of estimation individuals whose lifespans have expired) with the crossover operation. Then, the mutation operation is performed (step S503), so that the estimation individuals whose number is the same as that of the estimation individuals whose lifespans have expired are lastly generated.

The generated estimation individuals are added to the estimation individual table 180 as new records (step S504). How to perform the above described crossover and mutation operations, for example, where and how many crossover points are to be set, or where and how many bits to be inverted for the mutation operation are to be set, may be considered in a variety of ways. Here, any method can be adopted to obtain a preferable estimated response time. However, it is desirable that these settings are performed as randomly as possible in order to prevent the alternation of generations from being stopped.

FIGS. 10A and 10B are block diagrams showing the configuration of two computer networks 200 and 200A to which a path selecting apparatus according to a second preferred embodiment of the present invention is applied. As shown in FIG. 10A the computer network 200 to which a path selecting apparatus is applied comprises a service providing server group 210, a PROXY server group 220, a client group 230, a server group 260, a wide area network 240 including many network repeaters, such as the Internet, and a LAN 250. The service providing server group 210 and the PROXY server group 220 are respectively connected to the network 240. The client group 230 and the server group 260 are connected to the network 240 via the LAN 250 and the PROXY server group 220. The server group 260 is a group of servers, each of which provides clients 231, 232, ..., in the client group 230 with shared resources and a server capability. The server group 260 is distinct from the service providing server group 210 to be used in a wider area, such as WWW servers. Although the server group 260 and the client group 230 are interconnected via the LAN 250 in FIG. 10A, they may be connected in an arbitrary way.

Also, the client group 230A and the server group 260A may be directly connected to the network 240 not via the LAN and the PROXY server group 220A as shown in FIG. 10B.

Similar to the computer network 100 shown in FIGS. 1A and 1B, the service providing server group 210 is composed of servers 211, 212, 213, ..., which are connected to the network 240. The service providing server group 210 is provided also as mirror servers. For example, the server 211 includes 2 mirror servers, while the server 212 includes 1 mirror server.

The PROXY server group 220 is composed of servers 221, 222, ..., which are connected to the network 240.

The client group 230 is composed of clients 231, 232, ..., from which users issue service requests to the service providing server group 210 via the PROXY server group 220 and the network 240 as shown in FIG. 10A. Also users may directly issue service requests to the service providing servers 261, 262, ..., as shown in FIG. 10B.

The client group 230 frequently accesses the service providing server group 210 via the PROXY server group 220 as shown in FIG. 10A. However, the client group 230A may access the service providing server group 210 not via the PROXY server group 220A as shown in FIG. 10B. In the configuration shown in FIG. 10A, the client group 230 can access the service providing server group 210 via the server group 260 connected by the LAN 250.

Each of the clients, for example, the client 231, includes a path calculating unit 231A and a response information managing unit 231B. Also the client 232 includes units similar to those of the client 231 although this is not shown in FIGS. 10A and 10B. Other clients also have similar units.

The path calculating unit 231A and the response information managing unit 231B have the same capabilities as those of the path calculating unit 131A and the response information managing unit 131B, which are included in the client 131 in the path selecting apparatus shown in FIGS. 1A and 1B.

The server groups 260 and 260A are composed of servers 261, 262, ...

According to the second preferred embodiment of the present invention shown in FIGS. 10A and 10B, the server groups 260 and 260A include an estimation information managing unit 261A and a path information managing unit 261B. The estimation information managing unit 261A and the path information managing unit 261B substantially correspond to the estimation information managing unit 131C and the path information managing unit 131D. The capabilities implemented in the second preferred embodiment are the same as those implemented in the first preferred embodiment except for the data exchange operation between the respective units of the client group 230 and the server group 260, which may be sometimes performed via the LAN 250.

However, the estimation information managing unit 261A and the path information managing unit 261B are operated by the server group 260, so that the load when the client group 230 is introduced or the load when the network configuration is changed is reduced, or the data of the estimation individual table or of the actual response time table, which can be stored in the server group 26, can be managed intensively and together.

FIGS. 11A and 11B are block diagrams showing the configuration of a computer network 300 and 300A to which a path selecting apparatus according to a third preferred embodiment of the present invention are applied.

In FIG. 11A, a service providing server group 310 and a PROXY server group 320 are interconnected via a network 340. The PROXY server group 320 is connected to a LAN 350. Additionally, both the client group 330 and the server group 360 are connected to the LAN 350. Also, the client group 330A and the server group 360A may be directly connected to the network 340 not via the LAN 350 and the PROXY server group 320A as shown in FIG. 11B.

The service providing server group 310 is composed of service providing servers 311, 312, 313, ..., while the PROXY server group 320 is composed of PROXY servers 321, 322, .... These server groups 310 and 320 have configurations similar to those of the server groups 110 and 120 in the above described first preferred embodiment. The client group 330 is composed of clients 331, 332, ..., which have a configuration similar to that of the client group 230 in the second preferred embodiment.

The clients 331, 332, ... include a path calculating unit 331A and a response information managing unit 331B, similar to the clients 231, 232, ... in the second preferred embodiment. The path calculating unit 331A and the response information managing unit 331B have the same capabilities as those of the path calculating unit 131A and the response information managing unit 131B in the first preferred embodiment.

The server group 360 is composed of servers 361, 362, 363, . . . The server 361 includes a path information managing unit 361B and a path information sending unit 361C. The server 362 includes an estimation information managing unit 362C and an estimation information updating unit 362E. The path information managing unit 361B has almost the same capability as that of the path information managing unit 131D in the first preferred embodiment. The path information sending unit 361C sends mirror and PROXY server names provided by the path information managing unit 361B to the path calculating unit 331A. The estimation information managing unit 362C has a capability almost the same as that of the estimation information managing unit 162C in the first preferred embodiment. It provides the path calculating unit 331A with the most recent estimated information via the LAN 350 as shown in FIG. 11A (or not via the LAN as shown in FIG. 11B). The contents of the estimated information are similar to those of the estimated information in the first referred embodiment. Upon receipt of the information of the actual response time from the response information managing unit 331B via the LAN 350 as shown in FIG. 11A (or not via the LAN as shown in FIG. 11B), the estimation information updating unit 362E updates the estimated information that the estimation information managing unit 362C provides to the path calculating unit 331A.

The configurations of the path selecting apparatus according to the first, second, and third preferred embodiments are merely examples. The configuration of the respective units such as the path calculating unit, the response information managing unit, the estimation information managing unit, the path information managing unit, the estimation information updating unit, etc. may be implemented with an arbitrary connection method in a variety of ways. However, it is apparent for one skilled in the art to be able to apply the present invention to all of possible configurations without deviating from the intention and the scope of the present invention.

Furthermore, this specification refers to the example in which the optimum path between a client and a service providing server is selected only by a client, or by a cooperation between the client and the service providing server. However, such a capability can be implemented by a router or an IP switch, etc., or by a switch, etc. in a WAN such as a packet switching network, etc.

FIG. 12 is a block diagram exemplifying the hardware configuration of a client computer 1000 which implements the capabilities of the client group 130 included in the above described computer network 100. Both the client groups 230 and 330, and the server groups 260 and 360 in the computer networks 200 and 300 according to the second and third preferred embodiments of the present invention have similar configurations.

The client computer 1000 is composed of a CPU 1001, a storing unit 1002, a memory 1003, a displaying unit 1004, an inputting unit 1005, a printing unit 1006, and a network interface unit. 1007, which are all connected to a bus 1008. The CPU 1001 executes the respective capabilities of the units 131A through 131D shown in FIGS. 1A and 1B. The storing unit 1002 stores a program for implementing the respective capabilities of the units 131A through 131D, which are executed by the CPU 1001, and the data required for the path selecting apparatus according to the present invention, such as the estimation individual table 180, etc.

The memory 1003 is loaded with the program for implementing the respective capabilities of the units 131A through 131D, which are executed by the CPU (Central Processing Unit) 1001. In the memory 1003, the data of the estimation individual table 180, etc. are developed depending on need. With the path selecting apparatus according to the present invention, a path with the minimum estimated response time must be selected by dynamically comparing the estimated response time of each path. Therefore, it is desirable that the data required for such a dynamic process are developed in the memory 1003 whose access time is short.

The displaying unit 1004 may be sometimes needed in order to display a user interface screen for making an input such as the specification of a network address or the initial setting of the system, etc. Normally, the displaying unit 1004 is a display device such as a CRT (Cathode Ray Tube display), an LCD (Liquid Crystal Display), etc.

The inputting unit 1005 is a unit with which a user makes the above described inputs or issues an instruction on the user interface screen of the displaying unit 1004. This unit is implemented by an input device composed of a keyboard, a mouse, etc.

The printing unit 1006 is a printing device, such as a laser printer, etc., for printing the data stored in the storing unit 1002, etc. according to the user instruction issued via the inputting unit 1005.

The network interface unit 1007 is a unit for connecting the client computer 1000 (the client group 130) to the PROXY server group 120 via the LAN 150. If this connection is implemented via a public line network or a dedicated line, network connecting devices such as a modem, a terminal adapter, a DSU, a router, etc. are required. In this case, the network interface unit 1007 is a communication interface device including these devices. In the connection form according to the second preferred embodiment shown in FIG. 10, the network interface unit 1007 is implemented as the LAN interface connecting to the server group 260, and includes the capability for connecting to the PROXY server group 220 via the LAN.

The bus 1008 is a shared transmission line for transmitting/receiving data, commands, etc. between the above described units 1001 through 1007.

With the path selecting apparatus according to the present invention, the response time of a combination of arbitrary contiguous paths can be estimated even if the response data of some repeaters on a certain path cannot be collected. That is, according to the present invention, use of the actual response time (RT) per unit data length allows the response time of a target path to be estimated based on previously stored actual response time per unit data length of the target path, even if the information of the amount of passed data from each node is insufficient. Additionally, even if the actual response time per unit data length of the path which is the same as the path to be estimated is not stored, a required number of previous actual response times per unit data length of a path resembling the path to be estimated is selected, and an average value of actual response times after being weighted is calculated and used, thereby the response time of the target path can be estimated.

Additionally, with the path selecting method using the actual response time per unit data length according to the present invention, the overall response performance of the path from a transmission source address to a transmission destination address, which includes also the performances of a network repeater, a client, and a server, is evaluated, so that an optimum path can be selected based on that information.

Furthermore, with the path selecting method according to the present invention, a repeater contiguous to a client can be dynamically selected according to a dynamic change of its repeater performance.

Still further, with the path selecting method according to the present invention, a cooperative operation between path selecting apparatuses can be implemented. For example, a repeater to be used is determined depending on a cache type, so that the contents of a cache can be controlled not to be duplicated in repeaters.

Still further, with the path selecting method according to the present invention, even if a halfway communication path of transaction data is a selectable multi-path network with a different bandwidth, a response time can be estimated.

Still further, with the path selecting method according to the present invention, the following effects can be attained by using a genetic algorithm.

As the numbers of nodes and path patterns to be selected grow, the amount of calculation for estimating an optimum path significantly increases. However, use of the genetic algorithm allows an optimum path to be estimated with a relatively small amount of calculation in a short period despite the increasing complexity of a network.

Still further, with the genetic algorithm, it is sufficient to calculate a difference of an estimation individual (estimate parameter), which occurs due to a network environment change, by degrees. Unlike the conventional path selecting methods, the path selecting method according to the present invention does not require performing of a calculation based on the entire environmental data each time a path is selected.

Still further, use of the genetic algorithm can dynamically prevent the concentration of the traffic of the path whose response time significantly degrades, or of a certain node on a path. Because each client has totally different estimation individuals (chromosomes), the same estimate will never be made. That is, a cooperative estimate will be made. For example, the situation where a client A exclusively uses a node C, while a client B exclusively uses a node D, will automatically arise.

The above described effects of the present invention experimentally prove that the performance can be double the performances of the conventional systems in a predetermined network environment.

What is claimed is:

1. A path selecting apparatus directing a computer or computers to perform selecting a network path of data transmitted from a transmission source node to a transmission destination node, and a network path of data returned from the transmission destination node to the transmission source node in an environment where nodes are distributed and located via a network, comprising:

a path calculating module running software for obtaining an estimated response time for each of paths that can connect the transmission source node and the transmission destination node by using estimated information, and transmitting a service request message by using a path with a minimum estimated response time, when the transmission source node transmits the service request message to the transmission destination node in order to request a service of the transmission destination node;

a response information management module running software for storing as response information information about a transmission of the service request message, which includes at least a path on which the transmission is performed and a request data length of the service request message, in correspondence with the transmission of the service request message by said path calculating module, and further storing as the response information information about a reception of a response, which includes at least a response data length of the response and a value about a response time required from the transmission of the service request message till the reception of the response, when the transmission source node receives the response to the service request message from the transmission destination node; and an estimation information managing module running software for updating contents of the estimated information based on the response information in correspondence with the reception of the response by said response information managing module.

2. The path selecting apparatus according to claim 1, wherein:

the value about the response time is an actual response time indicating a response time per unit data length, and the actual response time is obtained by a following equation:

actual response time=(2×the response time)/(the request data length+the response data length).

3. The path selecting apparatus according to claim 1, wherein:

each of nodes includes the estimated information, the estimation information including at least one response time estimation individual, the response time estimation individual including a bit string signifying a chromosome and a degree of fitness, and the chromosome including at least one gene block corresponding to a parameter of a response time estimation function;

said estimation information managing module comprises a generation alternating module running software for generation-alternating the chromosome upon receipt of the response to the service request message;

said generation alternating module comprises a fitness degree calculating module running software for calculating the estimated response time by using the parameter of the response time estimation function set in each gene block included in the response time estimation individual, assigning a larger value to the degree of fitness of a response time estimation individual which estimates a more optimum response time, and assigning a larger lifespan value to the response time estimation individual as the degree of fitness becomes higher;

a response time estimation individual deleting module running software for determining a response time estimation individual whose lifespan expires and deleting the response time estimation individual; and a response time estimation individual generating module running software for selecting a plurality of existing response time estimation individuals with a higher degree of fitness with a higher probability, and performing a genetic operation with a predetermined probability for a chromosome of any of the plurality of response time estimation individuals in order to generate a new response time estimation individual for supplementing the response time estimation individual deleted by said response time estimation individual deleting module, and wherein:

the optimum path is autonomously estimated by evolving the response time estimation individual with a repetition of a generation alternation process performed by said generation alternating module in order to allow the optimum response time to be dynamically estimated.

4. The path selecting apparatus according to claim 3, wherein:

each of a plurality of schools including the estimated information and the response information is corresponded to at least one estimation information managing module;

within said generation alternating module included in said estimation information managing module:

said fitness degree calculating module can use the response information in another school when calculating the estimated response time; and said response time estimation individual generating module can select a response time estimation individual in another school when selecting an existing response time estimation individual in order to generate a new response time estimation individual for a corresponding school, and wherein:

a path is estimated while behaving cooperatively with other nodes to which said estimation information managing module corresponded with another school belongs.

5. The path selecting apparatus according to claim 4, wherein:

the value of the lifespan is obtained by an equation lifespan=((the degree of fitness of the response time estimation individual−a minimum value of the degree of fitness in a school)/(1−the minimum value of the degree of fitness in the school))×a maximum value of the lifespan in the school.

6. The path selecting apparatus according to claim 3, wherein the estimated response time is obtained by using:

actual response times in a plurality of pieces of response information, which are obtained by receiving a plurality of responses;

a first index indicating how much difference exists between a time at which each of the actual response times is measured and a time at which the degree of fitness is assigned; and a second index indicating how a distance of a path between the transmission source node and the transmission destination node, on which each of the actual response times is measured, influences a calculation of the estimated response time.

7. The path selecting apparatus according to claim 6, wherein the estimated response time is calculated based on:

the actual response times in the plurality of pieces of response information, which are obtained by receiving the plurality of responses, and times at which the actual response times are measured;

a coefficient of a degree of recency of the time at which each of the actual response times is measured, a coefficient of the distance of the path whose estimate target path and actual response time are measured, and a coefficient indicating a weight of the distance of each portion of address information about each node on each path whose estimate target path and actual response time are measured, which are stored in respective gene blocks in the response time estimation individual; and a constant of the degree of recency of the time at which each of the actual response times is measured, and a constant of the distance whose estimate target path and actual response time are measured.

8. The path selecting apparatus according to claim 7, wherein:

the estimated response time is obtained by using the actual response times $RT_i$ (i=1 to N) in the plurality of pieces of response information, which are obtained by receiving the plurality of responses, the times at which the actual response times are measured, a most recent influence coefficient (cnew), a distance influence coefficient (cdist), and four inter-subnetwork distance influence coefficients (csnet1, csnet2, csnet3, and csnet4), which are stored in each gene block in the response time estimation individual, based on an equation $$\text{Estimate Response Time} = \left(\sum_{i=1}^{N} RIR_i \times DIR_i \times RT_i\right) \Big/ \left(\sum_{i=1}^{N} RIR_i \times DIR_i\right)$$

where $RIR_i = e^{(-C1 \times cnew \times TAi)}$ (C1 is a positive constant, and $TA_i$ is a value obtained by subtracting a time at which an "i"th actual response time is measured from a time at which the estimated response time is calculated), and $DIR_i = 1/(C2 \times e^{-C3 \times cdist \times DE_i} + 1)$ (where C2 and C3 are positive constants, and $$DE_i = \sum_{k=1}^{4}\left(C_k \times \sum_{j=1}^{M} |R_{kij} - T_{kj}|\right)$$

(where "j" is a number of each node on a path of the "i"th response information, and "M" is a number of nodes on the path including the transmission source node and the transmission destination node. An IP address of the "j"th node on the estimate target path is represented as $T_{1j}$, $T_{2j}$, $T_{3j}$, and $T_{4j}$, and a "j"th IP address of each node on the path of the response information is represented as "$R_{1ij}$", "$R_{2ij}$", "$R_{3ij}$", and "$R_{4ij}$")), and $C_k = e^{(C4 \times csnetk)}$ (C4 is a positive constant).

9. The path selecting apparatus according to claim 6, wherein the degree of fitness is obtained based on:

the actual response times in the plurality of pieces of response information, which are obtained by receiving the plurality of responses;

an index indicating how much difference exists between the time at which each of the actual response times is measured and the time at which the degree of fitness is assigned by said fitness degree calculating module; and an absolute value of a difference between the estimated response time calculated by said fitness degree calculating module when each of the actual response times is measured, and each of the actual response times.

10. The path selecting apparatus according to claim 9, wherein the degree of fitness is calculated based on:

the estimated response time;

the actual response times in the plurality of pieces of response information, which are obtained by receiving the plurality of responses, and the times at which the actual response times are measured;

the coefficient of the degree of recency of the time at which each of the actual response times is measured, which is stored in each gene block in the response time estimation individual; and the constant of the degree of recency of the time at which each of the actual response times is measured.

11. The path selecting apparatus according to claim 10, wherein:

the degree of fitness is obtained by using the actual response times $RT_i$(i=1 to N) in the plurality of pieces of response information, which are obtained by receiving the plurality of responses, the times at which the actual response times are measured, and a most recent influence coefficient (cnew) stored in each gene block in the response time estimation individual, based on an equation $$Degree\ of\ Fitness = \left(\sum_{i=1}^{N} RIR_i\right) \bigg/ \left(\sum_{i=1}^{N} (dRT_i + 1) \times RIR_i\right) \quad (1)$$

where $RIR_i = e^{(-c1 \times cnew \times TAi)}$ (C1 is a positive constant, and $TA_i$ is a value obtained by subtracting a time at which an "i"th actual response time $RT_i$ is measured from the time at which the actual response time is measured), and $dRT_i$ is an absolute value of a difference between the estimate response when the "i"th actual response time $RT_i$ is calculated and the actual response time $RT_i$.

12. The path selecting apparatus according to claim 3, wherein:
the value of the lifespan is obtained by an equation lifespan=((the degree of fitness of the response time estimation individual–a minimum value of the degree of fitness)/(1–the minimum value of the degree of fitness))×a maximum value of the lifespan.

13. The path selecting apparatus according to claim 1, further comprising:
a path information managing module running software for providing at least one mirror server name corresponding to a name of a representative server when the transmission source node transmits the service request message to the representative server; and
providing at least one PROXY server name which can be used for transmitting the service request message when the transmission source node transmits the service request message via a PROXY server.

14. A node in an environment where nodes are distributed and located via a network, comprising:
a response information managing module running software for managing path information used for a previously issued service request, information of a response time of a service to the service request, and information of an amount of data exchanged for the service request; and
a path calculating module running software for selecting a path with a minimum estimated response time for a certain service request, based on the information managed by said response information managing module.

15. A node in an environment where nodes are distributed and located via a network, comprising:
an estimation information managing running software for managing estimated information used for estimating a response time of a service request on each path used for transmitting the service request issued from a service request source node to a service request destination node, and a response to the service request returned from the service request destination node to the service request source node, based on path information used for a previously issued service request, response time information of the previously issued service request, and an amount of data exchanged for the previously issued service request; and
a path information managing module running software for managing information of the service request destination node and information of a PROXY server used for transmitting the service request to the service request destination node.

16. A transmission source node for transmitting a service request to a transmission destination node via a network in an environment where nodes are distributed and located via the network, comprising:
a path calculating module running software for obtaining an estimated response time for each path that can connect the transmission source node and the transmission destination node by using estimated information, and transmitting a service request message by using a path with a minimum estimated response time, when the transmission source node transmits the service request message to the transmission destination node in order to request a service of the transmission destination node;
a response information managing module running software for storing as response information information about a transmission of the service request message, which includes at least a path on which the transmission is performed and a request data length of the service request message, in correspondence with the transmission of the service request message by said path calculating module, and further storing as the response information information about a reception of a response, which includes at least a response data length of the response and a value about a response time required from the transmission of the service request message till the reception of the response, when the transmission source node receives the response to the service request message from the transmission destination node;
an estimation information managing module running software for updating the contents of the estimated information based on the response information in correspondence with the reception of the response by said response information managing module; and
a path information managing module running software for providing at least one mirror server name corresponding to a name of a representative server when the transmission source node transmits the service request message to the representative server, and providing at least one name of a PROXY server which can be used for transmitting, the service request message, when the transmission source node transmits the service request message via a PROXY server.

17. A transmission source node for transmitting a service request to a transmission destination node via a network in an environment where nodes are distributed and located via the network, comprising:
a path calculating module running software for obtaining an estimated response time for each path that can connect the transmission source node and the transmission destination node by using estimated information, and transmitting a service request message by using a path with a minimum estimated response time, when the transmission source node transmits the service request message to the transmission destination node in order to request a service of the transmission destination node; and
a response information managing module running software for storing as response information information about a transmission of the service request message, which includes at least a path on which the transmission is performed and a request data length of the service request message, in correspondence with the transmission of the service request message by said path calculating module, and further storing as the response information information about a reception of a response, which includes at least a response data length of the response and a value about a response time required from the transmission of the service request message till the reception of the response, when the transmission source node receives the response to the service request message from the transmission destination node.

18. A node in an environment where nodes are distributed and located via a network, comprising:

an estimation information managing module running software for managing estimated information used for estimating a response time of a service request on each path used for transmitting the service request issued from a service request source node to a service request destination node, and a response to the service request returned from the service request destination node to the service request source node, based on path information used for a previously issued service request, response time information of the previously issued service request, and a data length exchanged for the previously issued service request; and an estimation information updating module running software for obtaining the path information, the response time information, and the data length of the response, and updating the estimated information managed by said estimation information managing module based on the obtained information, each time the response to the service request is received.

19. A path selecting apparatus comprising a first node and a second node, which are distributed via a network wherein:

said first node comprises an estimation information managing module running software for managing estimated information used for estimating a response time of a service request on each path used for transmitting the service request issued from a service request source node to a service request destination node, and a response to the service request returned from the service request destination node to the service request source node, based on path information used for a previously issued service request, response time information of the previously issued service request, and a data length exchanged for the previously issued service request;

an estimation information updating module running software for obtaining the path information, the response time information, and the data length of the response, and updating the estimated information managed by said estimation information managing module based on the obtained information, each time the response to the service request is received; and said second node comprises a path information managing module running software for managing the information about the service request destination node and the information about a PROXY server, which is used for transmitting the service request to the service request destination node.

20. A path selecting method for selecting a network path of data transmitted from a transmission source node to a transmission destination node, and a network path of data returned from the transmission destination node to the transmission source node in an environment where nodes are distributed and located via a network, comprising:

a path calculating operation obtaining an estimated response time for each path that can connect the transmission source node and the transmission destination node by using estimated information, and transmitting a service request message by using a path with a minimum estimated response time, when the transmission source node transmits the service request message to the transmission destination node in order to request a service of the transmission destination node;

a response information managing operation storing as response information information about a transmission of the service request message, which includes at least a path on which the transmission is performed and a request data length of the service request message, in correspondence with the transmission of the service request message by said path calculating operation, and further storing as the response information information about a reception of a response, which includes at least a response data length of the response and a value about a response time required from the transmission of the service request message till the reception of the response, when the transmission source node receives the response to the service request message from the transmission destination node; and an estimation information managing step of updating contents of the estimated information based on the response information in correspondence with the reception of the response by said response information managing operation.

21. The path selecting method according to claim 20, wherein:

the value about the response time is an actual response time indicating a response time per unit data length, and the actual response time is obtained by an equation actual response time=(2×the response time)/(the request data length+the response data length).

22. The path selecting method according to claim 20, wherein:

each of nodes includes the estimated information, the estimation information including at least one response time estimation individual, the response time estimation individual including a bit string signifying a chromosome and a degree of fitness, and the chromosome including at least one gene block corresponding to a parameter of a response time estimation function;

said estimation information managing operation comprises a generation alternating operation of generation-alternating the chromosome upon receipt of the response to the service request message;

said generation alternating operation comprises a fitness degree calculating operation calculating the estimated response time using the parameter of the response time estimation function set in each gene block included in the response time estimation individual, assigning a larger value to the degree of fitness of the response time estimation individual which estimates a more optimum response time, and assigning a larger lifespan value to the response time estimation individual as the degree of fitness becomes higher;

a response time estimation individual deleting operation determining a response time estimation individual whose lifespan expires and deleting the response time estimation individual; and a response time estimation individual generating operation selecting a plurality of existing response time estimation individuals with a higher degree of fitness with a higher probability, and performing a genetic operation with a predetermined probability for a chromosome of any of the plurality of response time estimation individuals in order to generate a new response time estimation individual for supplementing the response time estimation individual deleted by said response time estimation individual deleting operation, and wherein:

the optimum path is autonomously estimated by evolving the response time estimation individual with a repetition of a generation alternation process performed by said generation alternating operation in order to allow the optimum response time to be dynamically estimated.

23. The path selecting method according to claim 22, wherein:

each of a plurality of schools including the estimated information and the response information is corresponded to at least one estimation information managing operation;

within said generation alternating operation included in said estimation information managing step:

said fitness degree calculating operation uses the response information in another school when calculating the estimated response time; and said response time estimation individual generating operation selects a response time estimation individual in another school when selecting an existing response time estimation individual in order to generate a new response time estimation individual for a corresponding school, and wherein:

a path is estimated while behaving cooperatively with a system which executes said estimation information managing step corresponded with another school.

24. The path selecting apparatus according to claim 23, wherein:

the value of the lifespan is obtained by an equation lifespan=((the degree of fitness of the response time estimation individual−a minimum value of the degree of fitness in a school)/(1−the minimum value of the degree of fitness in the school))×a maximum value of the lifespan in the school.

25. The path selecting method according to claim 22, wherein the estimated response time is obtained by using:

actual response times in a plurality of pieces of response information, which are obtained by receiving a plurality of response;

a first index indicating how much difference exists between a time at which each of the actual response times is measured and a time at which the degree of fitness is assigned; and a second index indicating how a distance of a path between the transmission source node and the transmission destination node, on which each of the actual response times is measured, influences a calculation of the estimated response time.

26. The path selecting method according to claim wherein the estimated response time is calculated based on:

the actual response times in the plurality of pieces of response information, which are obtained by receiving the plurality of responses, and the times at which the actual response times are measured;

a coefficient of a degree of recency of the time at which each of the actual response times is measured, a coefficient of the distance of the path whose estimate target path and actual response time are measured, and a coefficient indicating a weight of the distance of each portion of address information about each node on each path whose estimate target path and actual response time are measured, which are stored in respective gene blocks in the response time estimation individual, and a constant of the degree of recency of the time at which each of the actual response times is measured, and a constant of the distance whose estimate target path and actual response time are measured.

27. The path selecting method according to claim 26, wherein the degree of fitness is obtained based on:

the actual response times in the plurality of pieces of response information, which are obtained by receiving the plurality of responses;

an index indicating how much difference exists between the time at which each of the actual response times is measured and the time at which the degree of fitness is calculated; and an absolute value of a difference between the estimated response time calculated when the actual response times are measured, and each actual response time.

28. The path selecting method according to claim 27, wherein the degree of fitness is calculated based on:

the estimated response time;

the actual response times in the plurality of pieces of response information, which are obtained by receiving the plurality of responses, and the time at which each of the actual response times is measured;

the coefficient of the degree of recency of the time at which each of the actual response times is measured, which is stored in each gene block included in the response time estimation individual; and the constant of the degree of recency of the time at which each of the actual response times is measured.

29. The path selecting method according to claim 28, wherein:

the degree of fitness is obtained by using actual response times $RT_i$ (i=1 to N) in a plurality of pieces of response information, which are obtained by receiving a plurality of responses, times at which the actual response times are measured, and a most recent influence coefficient (cnew) stored in each gene block in the response time estimation individual, based on an equation $$Degree\ of\ Fitness = \left(\sum_{i=1}^{N} RIR_i\right) \Big/ \left(\sum_{i=1}^{N} (dRT_i + 1) \times RIR_i\right)$$

where $RIR_i = e^{(-C1 \times cnew \times TAi)}$ (C1 is a positive constant, and $TA_i$ is a value obtained by subtracting a time at which an "i"th actual response time $RT_i$ is measured from the time at which the actual response time is measured), and $dRT_i$ is an absolute value of a difference between the estimate response when the "i"th actual response time $RT_i$ is calculated and the actual response time $RT_i$.

30. The path selecting method according to claim 26, wherein:

the estimated response time is obtained by using actual response times $RT_i$ (i=1 to N) in a plurality of pieces of response information, which are obtained by receiving a plurality of responses, times at which the actual response times are measured, a most recent influence coefficient (cnew), a distance influence coefficient (cdist), and four inter-subnetwork distance influence coefficients (csnet1, csnet2, csnet3, and csnet4), which are stored in each gene block in the response time estimation individual, based on an equation $$\text{Estimate Response Time} = \left(\sum_{i=1}^{N} RIR_i \times DIR_i \times RT_i\right) \bigg/ \left(\sum_{i=1}^{N} RIR_i \times DIR_i\right)$$

where $RIR_i = e^{(-C1 \times cnew \times TAi)}$ (C1 is a positive constant, and $TA_i$ is a value obtained by subtracting a time at which an "i"th actual response time is measured from a time at which the estimated response time is calculated), and $DIR_i = 1/(C2 \times e^{-C3 \times cdist} \times DE_i + 1)$ (where C2 and C3 are positive constants, and $$DE_i = \sum_{k=1}^{4} \left( C_k \times \sum_{j=1}^{M} |R_{kij} - T_{kj}| \right)$$

(where "j" is a number of each node on a path of the "i"th response information, and "M" is a number of nodes on the path including the transmission source node and the transmission destination node. An IP address of the "j"th node on the estimate target path is represented as $T_{1j}$, $T_{2j}$, $T_{3j}$, and $T_{4j}$, and a "j"th IP address of each node on the path of the response information is represented as "$R_{1ij}$", "$R_{2ij}$", "$R_{3ij}$", and "$R_{4ij}$")), and $C_k = e^{(-C4 \times csnetk)}$ (C4 is a positive constant).

31. The path selecting method according to claim 22, wherein:
the value of the lifespan is obtained by an equation lifespan=((the degree of fitness of the response time estimation individual–a minimum value of the degree of fitness)/(1–the minimum value of the degree of fitness))×a maximum value of the lifespan.

32. The path selecting method according to claim 20, further comprising:
a path information managing operation providing at least one mirror server name corresponding to a name of a representative server when the transmission source node transmits the service request message to the representative server; and
providing at least one name of a PROXY server which can be used for transmitting the service request message when the transmission source node transmits the service request message via a PROXY server.

33. A path selecting method for selecting a path on which a service request is transmitted from a transmission source node to a transmission destination node via a network in an environment where nodes are distributed and located via the network, comprising:
obtaining an estimated response time for each path that can connect the transmission source node and the transmission destination node by using estimated information, and transmitting the service request message by using a path with a minimum estimated response time, when the transmission source node transmits a service request message to the transmission destination node in order to request a service of the transmission destination node;
storing as response information information about a transmission of the service request message, which includes at least a path on which the transmission is performed and a request data length of the service request message, in correspondence with the transmission of the service request message, and further storing as the response information information about a reception of a response, which includes at least a response data length of the response and a value about a response time required from the transmission of the service request message till the reception of the response, when the transmission source node receives the response to the service request message from the transmission destination node;
updating the contents of the estimated information based on the response information in correspondence with the reception of the response; and
providing at least one mirror server name corresponding to a name of a representative server when the transmission source node transmits the service request message to the representative server, and providing at least one name of a PROXY server which can be used for transmitting the service request message when the transmission source node transmits the service request message via a PROXY server.

34. A path selecting method for selecting a path on which a service request is transmitted from a transmission source node to a transmission destination node via a network in an environment where nodes are distributed and located via the network, comprising:
obtaining an estimated response time for each path that can connect the transmission source node and the transmission destination node by using estimated information, and transmitting the service request message by using a path with a minimum estimated response time, when the transmission source node transmits a service request message to the transmission destination node in order to request a service of the transmission destination node; and
storing as response information information about a transmission of the service request message, which includes at least a path on which the transmission is performed and a request data length of the service request message, in correspondence with the transmission of the service request message, and further storing as the response information information about a reception of a response, which includes at least a response data length of the response and a value about a response time required from the transmission of the service request message till the reception of the response, when the transmission source node receives the response to the service request message from the transmission destination node.

35. A computer-readable storage medium, which stores a program implementing a method for selecting a path on which a service request is transmitted from a transmission source node to a transmission destination node via a network in an environment where nodes are distributed and located via the network, for directing a computer to perform:
obtaining an estimated response time for each path that can connect the transmission source node and the transmission destination node by using estimated information, and transmitting the service request message by using a path with a minimum estimated response time, when the transmission source node transmits a service request message to the transmission destination node in order to request a service of the transmission destination node;

storing as response information information about a transmission of the service request message, which includes at least a path on which the transmission is performed and a request data length of the service request message, in correspondence with the transmission of the service request message, and further storing as the response information information about a reception of a response, which includes at least a response data length of the response and a value about a response time required from the transmission of the service request message till the reception of the response, when the transmission source node receives the response to the service request message from the transmission destination node: and updating contents of the estimated information based on the response information in correspondence with the reception of the response.

36. A computer-readable storage medium, which stores a program implementing a method for selecting a path on which a service request is transmitted from a transmission source node to a transmission destination node via a network in an environment where nodes are distributed and located via the network, for directing a computer to perform:

obtaining an estimated response time for each path that can connect the transmission source node and the transmission destination node by using estimated information, and transmitting the service request message by using a path with a minimum estimated response time, when the transmission source node transmits a service request message to the transmission destination node in order to request a service of the transmission destination node;

storing as response information information about a transmission of the service request message, which includes at least a path on which the transmission is performed and a request data length of the service request message, in correspondence with the transmission of the service request message, and further storing as the response information information about a reception of a response, which includes at least a response data length of the response and a value about a response time required from the transmission of the service request message till the reception of the response, when the transmission source node receives the response to the service request message from the transmission destination node; and updating the contents of the estimated information based on the response information in correspondence with the reception of the response; and providing at least one mirror server name corresponding to a name of a representative server when the transmission source node transmits the service request message to the representative server, and providing at least one name of a PROXY server which can be used for transmitting the service request message when the transmission source node transmits the service request message via a PROXY server.

37. A computer-readable storage medium, which stores a program implementing a method for selecting a network path of data transmitted from a transmission source node to a transmission destination node, and a network path of data returned from the transmission destination node to the transmission source node in an environment where nodes are distributed and located via a network, for directing a computer to perform:

providing at least one mirror server name corresponding to a name of a representative server when the transmission source node transmits a service request message to the representative server, and providing at least one name of a PROXY server which can be used for transmitting the service request message when the transmission source node transmits the service request message via a PROXY server.

* * * * *